US012590455B2

(12) United States Patent
Quinby

(10) Patent No.: US 12,590,455 B2
(45) Date of Patent: Mar. 31, 2026

(54) AUDIO MANAGEMENT SYSTEM FOR A VIRTUAL PRODUCTION VOLUME

(71) Applicant: Michael Quinby, Portland, OR (US)

(72) Inventor: Michael Quinby, Portland, OR (US)

(73) Assignee: Nine Echoes, Inc., Spokane, WA (US)

( * ) Notice: Subject to any disclaimer, the term of this patent is extended or adjusted under 35 U.S.C. 154(b) by 257 days.

(21) Appl. No.: 18/307,611

(22) Filed: Apr. 26, 2023

(65) Prior Publication Data

US 2023/0340782 A1 Oct. 26, 2023

Related U.S. Application Data

(60) Provisional application No. 63/385,898, filed on Dec. 2, 2022, provisional application No. 63/380,733, filed (Continued)

(51) Int. Cl.
*E04B 1/82* (2006.01)
*G10K 11/00* (2006.01)

(52) U.S. Cl.
CPC .......... *E04B 1/8227* (2013.01); *G10K 11/002* (2013.01)

(58) Field of Classification Search
CPC ....... E04B 1/8227; E04B 1/74; G10K 11/002; G10K 11/162; H04N 5/222; H04N 5/2224;

(Continued)

(56) References Cited

U.S. PATENT DOCUMENTS 3,024,701 A * 3/1962 Marks ........................ F21V 3/04 264/108
4,290,332 A * 9/1981 Schoeffling, Jr. ...... G10K 11/16 84/723

(Continued)

FOREIGN PATENT DOCUMENTS

CN 103281651 A 9/2013
CN 203374176 U 1/2014

(Continued)

OTHER PUBLICATIONS

"Star Wars The Mandalorian Season 1". DeltaHDesign. Jan. 16, 2022. Web. May 22, 2025. <deltahdesign.com/portfolio/star-wars-the-mandalorian>. Internet Archive, <web.archive.org/web/20220116105022/https://deltahdesign.com/portfolio/star-wars-the-mandalorian> (Year: 2022).*

(Continued)

*Primary Examiner* — Dedei K Hammond
*Assistant Examiner* — Jennifer B Olson
(74) *Attorney, Agent, or Firm* — Kolitch Romano Dascenzo Gates LLP

(57) ABSTRACT

A sound management system for a virtual production volume may include one or more acoustic baffles configured to reduce sound reverberation within the production volume while allowing transmission of visible light through the baffle. In some examples, the system may comprise a transparent baffle curtain hanging from a frame. The transparent baffle curtain may be configurable in terms of position, size, and/or orientation, such that the baffle curtain is movable to different locations within the virtual production volume. The transparent baffle curtain may be coupled to one or more frames configured to permit repositioning and/or relocation of the structure within the virtual production volume. The baffle curtain may be configured to absorb (Continued)

and/or diffuse sound waves incident on the baffle curtain and allow transmission of visible light through the baffle curtain.

20 Claims, 22 Drawing Sheets

Related U.S. Application Data on Oct. 24, 2022, provisional application No. 63/335,140, filed on Apr. 26, 2022.

(58) Field of Classification Search

CPC . H04N 5/28; H04N 7/157; E04H 3/22; E04H 3/24; E04H 3/26; E04H 3/28; E04H 3/30; G03B 21/22; G03B 21/62; G03B 21/625; G03B 21/624

USPC ......... 181/30, 175, 198, 210, 284, 287, 289, 181/286

See application file for complete search history.

(56) References Cited

U.S. PATENT DOCUMENTS

| | | | | | |
|---|---|---|---|---|---|
| 6,145,571 | A * | 11/2000 | Snyder | E06B 9/58 | 160/264 |
| 6,446,751 | B1 * | 9/2002 | Ahuja | A47H 23/02 | 181/290 |
| 8,028,791 | B2 * | 10/2011 | Kliegle | E04B 9/001 | 52/22 |
| 8,091,605 | B1 * | 1/2012 | Melhart | A47G 5/00 | 160/351 |
| 8,617,715 | B2 * | 12/2013 | Shively | E06B 9/40 | 428/458 |
| 8,739,925 | B1 * | 6/2014 | Perdue | E04B 1/8227 | 181/290 |
| 12,118,972 | B2 * | 10/2024 | Forrest | B32B 37/1284 | |
| 2003/0037490 | A1 | 2/2003 | Stark, III et al. | | |
| 2020/0013383 | A1 | 1/2020 | Forest | | |
| 2024/0359615 | A1 * | 10/2024 | Nowac | G09F 9/33 | |

FOREIGN PATENT DOCUMENTS

| | | | | | |
|---|---|---|---|---|---|
| CN | 103717814 | A | * | 4/2014 | E04H 3/22 |
| CN | 110974247 | A | | 4/2020 | |
| KR | 20120004929 | U | * | 7/2012 | E04H 1/12 |
| KR | 20210136774 | A | * | 11/2021 | E06B 9/40 |

OTHER PUBLICATIONS

Holden, Shawn. "Mixing the Mandalorian Season One This is the Way." Production Sound & Video, Summer 2020, p. 22-26 (Year: 2020).*

Machine translation of CN-103717814-A (Year: 2014).*

Machine translation of KR-20120004929-U (Year: 2012).*

Machine translation of KR-20210136774-A (Year: 2021).*

International Search Report and Written Opinion of the International Searching Authority from the Korean Patent Office, in PCT/US2023/020011 dated Aug. 11, 2023, which is an international application to which this application claims priority.

* cited by examiner

AUDIO MANAGEMENT SYSTEM FOR A VIRTUAL PRODUCTION VOLUME

CROSS-REFERENCES

The following applications and materials are incorporated herein, in their entireties, for all purposes: U.S. Provisional Patent Application Ser. No. 63/335,140, filed Apr. 26, 2022, U.S. Provisional Patent Application Ser. No. 63/380,733, filed Oct. 24, 2022, and U.S. Provisional Patent Application Ser. No. 63/385,898, filed Dec. 2, 2022.

FIELD

This disclosure relates to systems and methods for improving sound capture in a reflective environment.

INTRODUCTION

The use of virtual production stages for filmmaking has increased in previous years, as an alternative or supplement to existing "green screen" technology. In general, these virtual production volumes are sets having large LED walls surrounding a stage, where the desired background can be displayed on the walls during production. Virtual production volumes have many advantages over existing green screen and blue screen methods, such as allowing performers to see the background setting in real time while acting out scenes. However, due to the large size of the virtual production volumes it is difficult to capture usable dialogue spoken by the performers within the virtual production volume. Instead, film makers often are required to use ADR or Automated Dialogue Replacement (sometimes referred to as Auxiliary Dialog Recording, Additional Dialog Replacement) which requires dubbing in the dialogue during post-production editing. Thus, there is a need for a way to improve dialogue capture within these and other virtual production environments.

SUMMARY

The present disclosure provides systems, apparatuses, and methods relating to sound management systems.

In some examples, a method of improving sound capture in a virtual production volume includes: positioning an acoustic baffle curtain between a first portion of a display wall of a virtual production volume and a stage area of the virtual production volume; and reducing echoing in the stage area by redirecting sound waves using the acoustic baffle curtain; wherein the acoustic baffle curtain is clear and transparent, such that visible light produced by the display wall is transmitted to the stage area through the baffle curtain.

In some examples, a system for improving audio capture in a virtual production volume includes: a virtual production volume including an electronic display wall at least partially enclosing a stage area; and an acoustic baffle curtain disposed on an interior of the production volume and configured to redirect sound waves incident on the acoustic baffle curtain; wherein the acoustic baffle curtain is transparent, such that visible light produced by the display wall is transmitted to the stage area through the baffle curtain.

In some examples, A system for improving sound capture in a virtual production volume, the system comprising: a virtual production volume including an electronic display wall at least partially enclosing a stage; and an acoustic baffle curtain disposed on an interior of the production volume, the acoustic baffle curtain comprising a plurality of curtain sections each coupled to a frame; wherein each of the curtain sections is transparent to visible light, such that light produced by the display wall passes through the curtain sections to the stage area; and wherein at least one of the curtain sections is oriented non-vertically.

Features, functions, and advantages may be achieved independently in various embodiments of the present disclosure, or may be combined in yet other embodiments, further details of which can be seen with reference to the following description and drawings.

DETAILED DESCRIPTION

Figure 1:
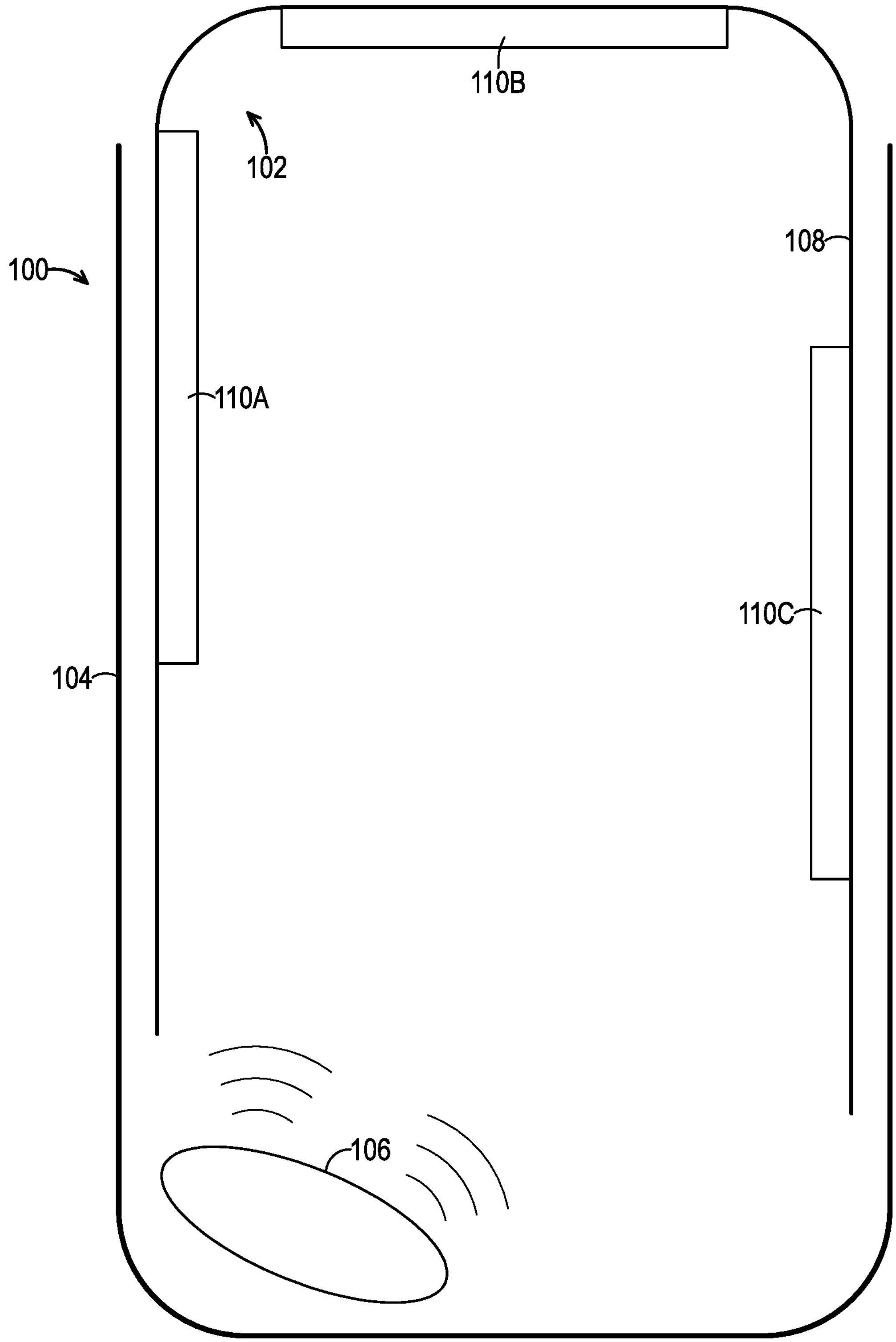
FIG. 1 is a schematic diagram of an illustrative virtual production volume having a sound management system in accordance with aspects of the present disclosure.

Various aspects and examples of a system for managing sound quality (e.g., reducing reverberation, echo, and the like) in a virtual production volume, as well as related methods, are described below and illustrated in the associated drawings. Unless otherwise specified, a sound management system in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, a sound management system of the present disclosure is configured to improve sound capture within a virtual production volume (AKA a virtual production stage or virtual production environment), and may include a novel baffle curtain or combination of curtains selectively disposed within the virtual production volume. The baffle curtain is configured to absorb, diffuse, and/or redirect sound waves to reduce reverberation within the virtual production environment, while also being translucent or transparent with respect to visible light. This arrangement helps with the management of sound in a virtual production volume, while facilitating ambient (and other) lighting within the virtual production volume.

The virtual production volume may include any suitable virtual production stage configured to be used for filming movies, television shows, and/or other audio-visual content. For example, the virtual production volume may include a large wraparound (e.g., LED) display screen configured to display a virtual background or setting (e.g., for real world actors) using a software or gaming engine (e.g., Unreal Engine®) configured to ensure the background is properly simulated or displayed to generate a virtual three-dimensional environment. In some examples, the virtual production volume includes a large open stage having an LED wall formed in an oblong shape at least partially around the stage. The LED wall includes one or more LED panels configured to display a background setting for the visual content being filmed, and performers act out scenes on the stage in front of the LED wall. Ambient light from scenery displayed by the LED walls further enhances the experience for the viewer, as scene-specific hues and intensities can result in a more realistic lighting scenario (especially as compared, e.g., with green-screen or blue-screen methods). Although these are referred to as "LED" walls or panels, any similarly suitable display technology may be utilized.

The sound-reflective LED walls and large open space of the virtual production volume cause sound reverberation and echoing of dialog spoken by actors within the virtual production environment. As a result, capturing high quality sound and spoken dialog within the virtual production volume may be difficult or impossible, and filmmakers often compensate for this using Automated or Additional Dialog Replacement (ADR). ADR involves adding or editing dialog during post production.

Sound management systems of the present disclosure are configured to increase the probability of capturing usable dialogue by absorbing sound waves, diffusing sound waves, and/or redirecting sound waves away from the sonically reflective surfaces of the LED walls. The system is further configured to avoid the blocking of ambient light produced by the LED walls, such that the ambient light can continue to be utilized by the director and actors.

Sound management systems of the present teachings may include any suitable baffle configured to absorb, diffuse, and/or redirect sound waves while also allowing visible light to pass through the baffle. Any suitable number and configuration of baffles (e.g., baffle curtains) may be used in the virtual production volume, depending on the size of the production environment, the desired effect, etc. In some examples, the management system includes one or more acoustic baffle curtains disposed in front of a portion of the LED wall in a position configured to remain out of frame. Put another way, the baffle curtains may be positioned between a portion of the LED wall and a stage area in which the performers are acting. In some examples, the baffle curtains are disposed approximately 2 to 3 feet in front of the LED wall, although any suitable distance may be used. In some examples, the curtains comprise a translucent or transparent material, such that visible light from the portion of the LED wall behind the baffle curtain passes through the baffle. In some examples, the acoustic baffle curtains may be disposed in front of a portion of the LED wall that is not directly behind the area where the actors are performing, to avoid blocking the background scene displayed on the wall. The baffle curtain may be configured to extend substantially from the top to the bottom of the LED wall to maximize the sound absorption area of the sound management system.

The acoustic baffle curtain may be configurable in terms of position, size, and/or orientation, e.g., such that it is easily moved to different locations within the virtual production volume. To accomplish this, one or more baffle curtains may be coupled to one or more frames configured to permit repositioning and/or relocation of the structure within the virtual production volume. In some examples, the transparent baffle curtain hangs or otherwise extends from a curtain rail attached to a top area of the virtual production structure and/or a ceiling of a building or room in which the virtual production volume is disposed. The curtain rail may extend around an internal periphery of the volume. The baffle curtain may be slidably coupled to the curtain rail, such that the curtain can slide along the curtain rail to change the position of the baffle curtain within the production volume. The curtain rail may have any suitable configuration. In some examples, the curtain rail may extend outside of the virtual production environment, such that the baffle curtains may be moved outside of the production environment when not in use.

Alternatively or additionally, the baffle curtain may hang from a portable stand, being attached at a bottom end to a movable ballast (e.g., a rollable box), such that the baffle curtain can be easily repositioned within the virtual production volume. The baffle curtain may be free-hanging from the portable stand, or the baffle curtain may be anchored to the ground by any suitable ballasting mechanism, such as a sandbag. In some examples, the ballasting mechanism is pivotably coupled (e.g., hinged) to the portable stand and configured to transition the baffle curtain between a deployed position, in which the baffle curtain extends to a ground and/or proximate the ground of the production volume, and a storage position, in which the ballasting mechanism is pivoted upwards, such that the baffle curtain is moved away from the ground of the production volume and the portable stand is movable.

In some examples, the baffle curtain has a variable surface geometry to facilitate improved sound absorbing, diffusing, dispersing, and/or redirecting properties. For example, the baffle curtain may include a plurality of curtain sections each held at a different angle (e.g., pitch angle) relative to the ground or stage (or relative to a horizontal plane, also referred to as the X-Y plane). Some curtain sections may be anchored to the ground at an oblique angle, while other curtain sections hang freely (i.e., vertically), such that the collective surface of the baffle curtains forms a variable surface geometry. In some examples, all curtain sections are coupled to a same upper structure (e.g., a horizontal rod). Anchored and free-hanging sections may alternate along a length of the baffle curtain, or different sections may be ballasted at different (e.g., opposite) angles. In some examples, the baffle curtains are alternatively or additionally arranged at a plurality of yaw angles (e.g., about the Z axis). In some examples, a plurality of baffle curtains are each disposed within the virtual production volume at different angles relative to the stage. The varied angle of each of the baffle curtains improves sound absorption and/or sound redirection of the sound management system.

Baffle curtains of the present disclosure may comprise any suitable material and/or structure configured to absorb, redirect, diffuse, and/or baffle sound waves while allowing visible light from the LED walls to pass through. As non-limiting examples the baffle curtain may comprise air column bubble wrap, double polished clear vinyl, a biomaterial, and/or any other suitable material.

Baffle curtains of the present disclosure comprise a material that is transparent to visible light (e.g., having relatively high visible light transmission). The baffle curtains may comprise a material that is highly transmissive with respect to visible light. For example, the material may have a transmittance of 90% or more with respect to visible light. In some examples, materials are utilized having a transmittance of at least 25%, at least 50%, or at least 75% with respect to visible light. Utilizing a material having visible light transmission facilitates the use of visible light produced by the LED wall of the production volume as ambient lighting within the production volume. In some examples, different portions of individual curtains have different transparency levels and/or opaque sections. In some examples, transparent curtains are combined (e.g., alternated or grouped) with opaque curtains to achieve a desired effect.

In some examples, the curtain comprises a material having fire-resistant properties. For example, material of the baffle curtain may be configured to pass one or more flame resistance tests, e.g., CFM Reg. No. F-491, NFPA-701, CPAI-84. In this context, NFPA stands for National Fire Protection Association and CPAI stands for Canvas Products Association International.

Baffle curtains of the present disclosure may have any suitable thickness and weight. As a non-limiting example, the material of the baffle curtain may have a thickness of 16-20 mm and a weight of 14 to 17 oz/square yard.

Examples, Components, and Alternatives

The following sections describe selected aspects of illustrative systems for sound management systems as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Virtual Production Volume

As shown in FIG. 1, this section describes an illustrative virtual production volume 100 including an illustrative audio or sound management system 102. Sound management system 102 is an example of the sound management system described above in the overview.

Virtual production volume 100 may include any suitable virtual production stage configured to be used for filming movies, tv shows, or other audiovisual content. For example, as shown in FIG. 1, virtual production volume 100 may include an LED wall 104 formed in an oblong (e.g., oval) shape having an opening (e.g., on one side). LED wall 104 may be formed in any suitable shape, such as a horseshoe shape. A performance area 106 is formed in a portion of the open space partially surrounded by LED wall 104. LED wall 104 is configured to display a virtual background or setting (e.g., for a scene involving real world actors) using a software or gaming engine (e.g., Unreal Engine), such that actors performing in performance area 106 can see the visual content. In some examples, the virtual background is synced or otherwise coordinated with one or more cameras capturing the scene, e.g., to ensure the proper background is displayed based on the camera angle. Virtual production volume 100 may have any suitable dimensions for use in filming TV shows, movies, etc. In some examples, LED wall 104 is approximately 30 feet tall. The large size of virtual production volume 100 and the sound reflective surfaces of LED wall 104 may cause echo and sound reverberation within the volume. As a result, it may be difficult to capture high quality sound recordings of dialog spoken by performers within the virtual production volume.

Sound management system 102 is configured to absorb, dampen, diffuse, and/or baffle sound waves, and thus reduce echo and sound reverberation within production volume 100. Sound management system 102 is further configured to avoid interfering with or blocking the desirable ambient light produced by LED wall 104. Sound management system 102 may include any suitable device configured to absorb or baffle sound waves, while also allowing light to pass through the device. For example, sound management system 102 may include at least one baffle (depicted as baffles 110A, 110B, 110C and referred to as 110A-C) configured to absorb and/or diffuse sound waves incident on the baffle. Baffles 110A-C may each comprise a transparent material to facilitate the pass-through of ambient light produced by LED wall 104. Although three baffles are described here, any suitable number of one or more baffles may be utilized.

Baffles 110A-C are configurable in terms of position, size, and/or orientation, such that the baffles are easily moved to different locations within the virtual production volume. To accomplish this, baffles 110A-C may be coupled to one or more frames configured to facilitate repositioning and/or relocation of the structure within the virtual production volume. For example, as shown in FIG. 1 baffles 110A-C may be curtains attached at a top end to a curtain rail 108. Curtain rail 108 may be attached to a ceiling or other structure of the virtual production volume and may extend around a periphery of the production volume. In some examples, curtain rail 108 is positioned such that baffle curtain 110A-C hangs from the curtain rail two to three feet in front of LED wall 104, although curtain rail 108 may be spaced from LED wall 104 by any suitable distance. Baffle curtains 110A-C are slidably coupled to curtain rail 108 to facilitate moving the baffle curtains 110A-C to different locations within virtual production volume 100.

In some examples, as shown in FIG. 1, curtain rail 108 and baffle curtains 110A-C are disposed around the portion of virtual production volume 100 opposite performance area 106, and not disposed behind the performance area. This facilitates baffle curtains 110A-C baffling sound waves generated by performers within performance area 106 without interfering with the background scene displayed on LED wall 104. As mentioned above, any suitable number and size of baffle curtains may be used in the virtual production volume.

Baffle curtains 110A-C may have a variable surface geometry configured to improve the sound absorption properties of the baffle curtain. For example, the baffle curtain may include a plurality of curtain sections held at different angles relative to the ground (e.g., different pitch and/or yaw angles). In some examples, some sections of the baffle curtain are ballasted to the ground by an anchor at an oblique angle relative to the ground, while other sections hang freely (i.e., vertically). The free hanging and anchored sections may be alternated along the length of the baffle curtain, such that the surface of the baffle curtain has alternating sections disposed at different angles. In some examples, each baffle, and/or each baffle section is textured. Varying the surface angles and/or the texture of the baffle curtain may increase sound absorption by the baffle curtain. The anchored sections of the baffle curtain may be anchored to the ground by sandbags, or any other suitable ballasting mechanism.

Baffle curtains 110A-C may comprise any suitable material configured to absorb and/or diffuse sound, and to allow light to pass through. For example, baffle curtains 110A-C may comprise an at least partially transparent and/or translucent material (e.g., having relatively high visible light transmission). The baffle curtains may comprise a material that is highly transmissive with respect to visible light. For example, the material may have a transmittance of 90% or more with respect to visible light. In some examples, materials are utilized having a transmittance of at least 25%, at least 50%, or at least 75% with respect to visible light. Utilizing a material having visible light transmission facilitates the use of visible light produced by the LED wall of the production volume as ambient lighting within the production volume. In some examples, baffle curtains 110A-C comprise a fire-resistant material. In some examples, baffle curtain material is clear (i.e., having no coloration) so as to avoid altering the hue and/or saturation of ambient light.

B. First Illustrative Audio Management System

Figure 2:
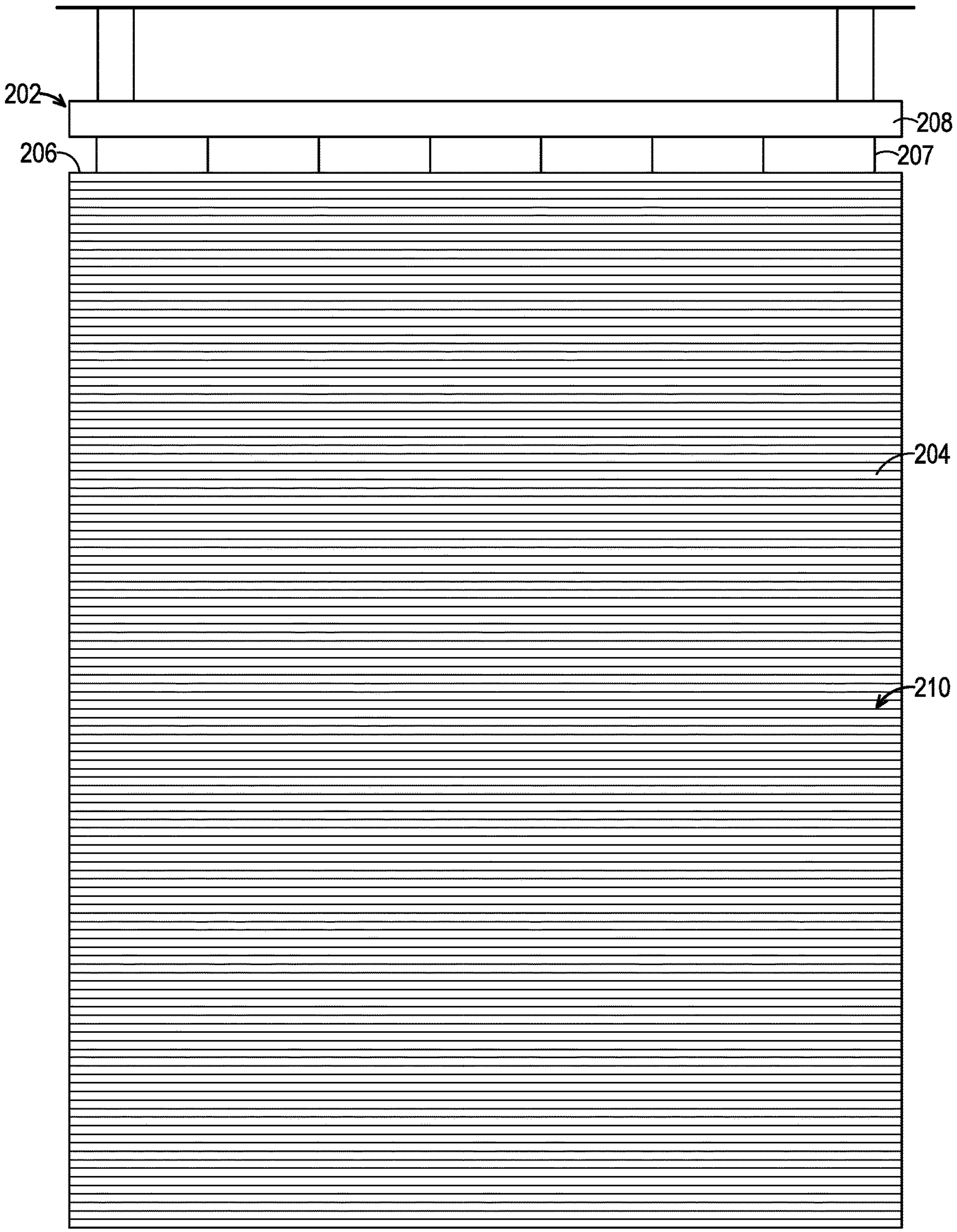
FIG. 2 is a schematic diagram of an illustrative sound management system in accordance with aspects of the present disclosure.
Figure 3:
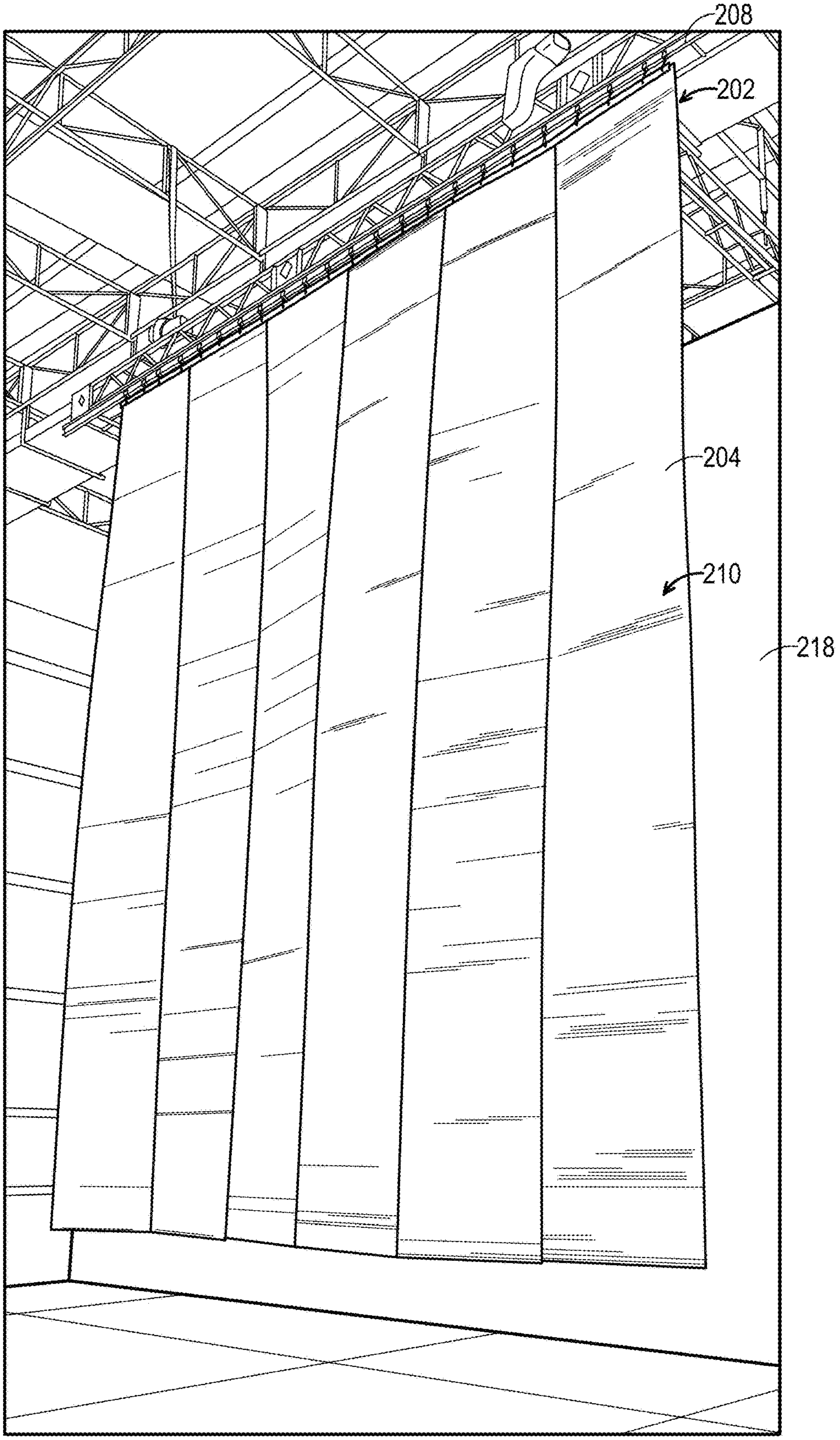
FIG. 3 is a perspective view of the sound management system of FIG. 2.
Figure 4:
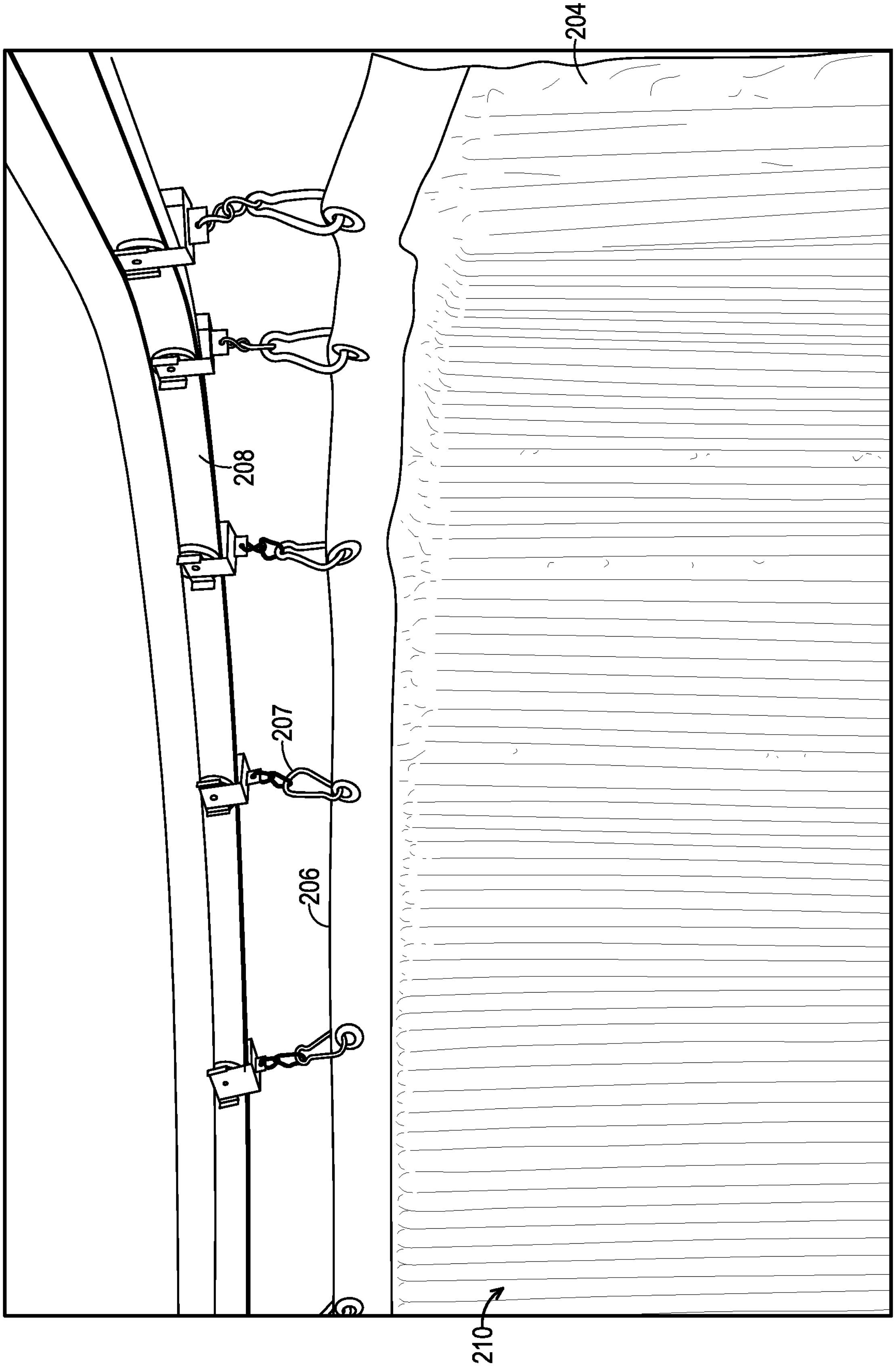
FIG. 4 is a perspective view showing illustrative attachment features of the sound management system of FIG. 2.

As shown in FIGS. 2-4, this section describes an illustrative sound management system 202. Sound management system 202 is an example of sound management system 102, described above.

Due to the large size and sound reflective LED wall of a virtual production volume, capturing usable dialogue spoken by actors within the virtual production volume may be difficult or impossible. Sound management system 202 includes a baffle curtain 204 configured to absorb and/or diffuse sound waves, and thus reduce sound reverberation within the virtual production volume. Baffle curtain 204 is configured to be positioned in front of portions of an LED wall 218 or other sound reflective surfaces of the virtual production volume to reduce sound reverberation within the virtual production volume and to block sound waves from reflecting off the LED wall. Baffle curtain 204 comprises a transparent material to allow light produced by the LED wall to pass through the baffle curtain.

Any suitable number of baffle curtains 204 may be used in the virtual production volume, and baffle curtain 204 may be disposed in any suitable position within the virtual production volume. In some examples, baffle curtain 204 is configured to be spaced approximately two to three feet from the LED wall, or approximately one-half to one meter from the wall. Baffle curtain 204 may have any suitable dimensions. For example, baffle curtain 204 may be configured to extend at least substantially from a top (or upper edge) to a bottom (or lower edge) of the LED wall of the virtual production volume.

Baffle curtain 204 may be coupled to one or more frames configured to permit repositioning and/or relocation of the baffle curtain within the virtual production volume. For example, as shown in FIGS. 2-4, Baffle curtain 204 is coupled at a top end 206 to a curtain rail 208 by a plurality of slidable attachment pieces 207, such that baffle curtain 204 is configured to slide along curtain rail 208. Curtain rail 208 may be attached to a ceiling 209 or upper structure of the virtual production volume and extend around a portion or an entirety of the virtual production volume. Slidably attaching baffle curtain 204 to curtain rail 208 facilitates baffle curtain 204 being selectively moveable to different locations within the virtual production volume. Baffle curtain 204 may have any suitable dimensions for use in the virtual production volume. In some examples, baffle curtain 204 is configured to extend from curtain rail 208 to, or nearly to, a ground or base or floor of the virtual production volume.

Baffle curtain 204 may comprise any suitable material configured to absorb or diffuse sound waves, while also facilitating ambient light passing through the baffle curtain. For example, baffle curtain 204 may comprise a clear transparent plastic (e.g., vinyl) material. In some examples, baffle curtain 204 has a textured and/or non-planar surface 210 configured to facilitate improved sound absorption and/or diffusion by baffle curtain 204. For example, surface 210 may have a ribbed texture. Surface 210 may have any suitable texture to facilitate sound absorption and/or diffusion by baffle curtain 204. In some examples, baffle curtain 204 comprises a material having fire-resistant properties, such as a flame-resistant biomaterial, a flame-resistant bubble wrap, and/or a flame-resistant vinyl material. For example, baffle curtain 204 may comprise a clear transparent vinyl currently sold under the designation SC-7H and SC-7-20.

C. Second Illustrative Audio Management System

Figure 5:
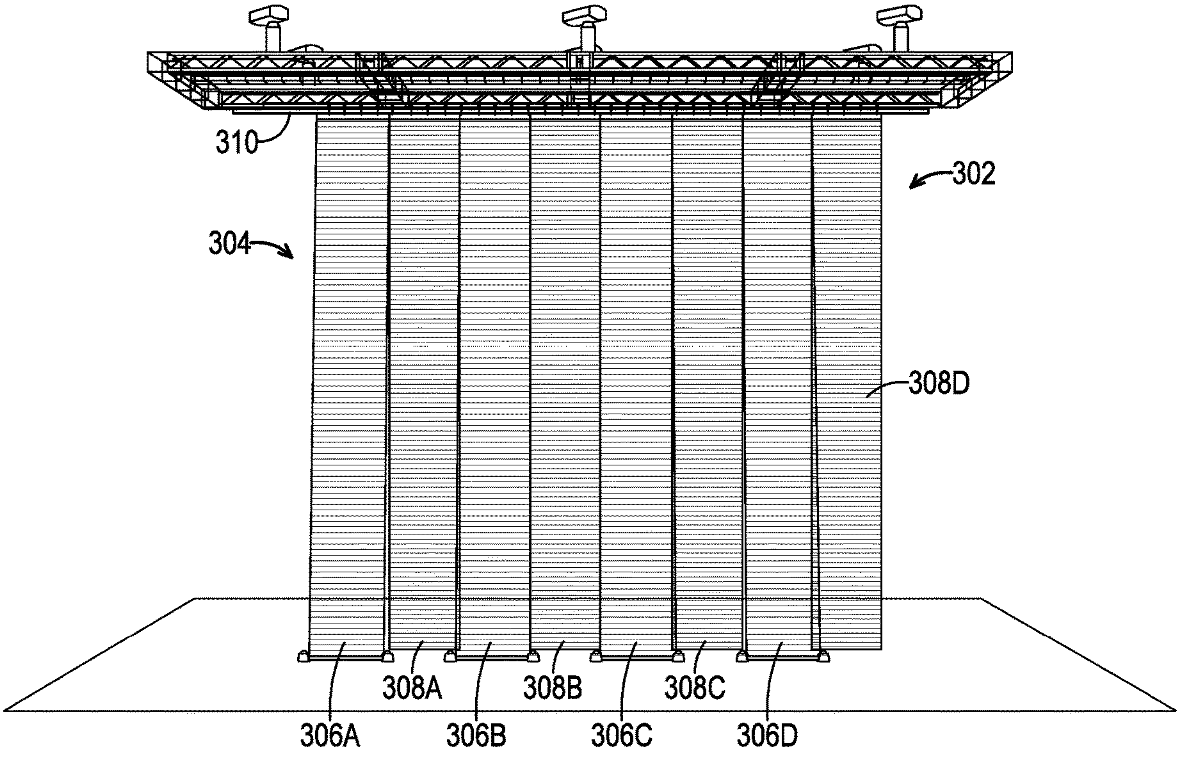
FIG. 5 is an orthogonal view of another illustrative sound management system in accordance with aspects of the present disclosure.
Figure 6:
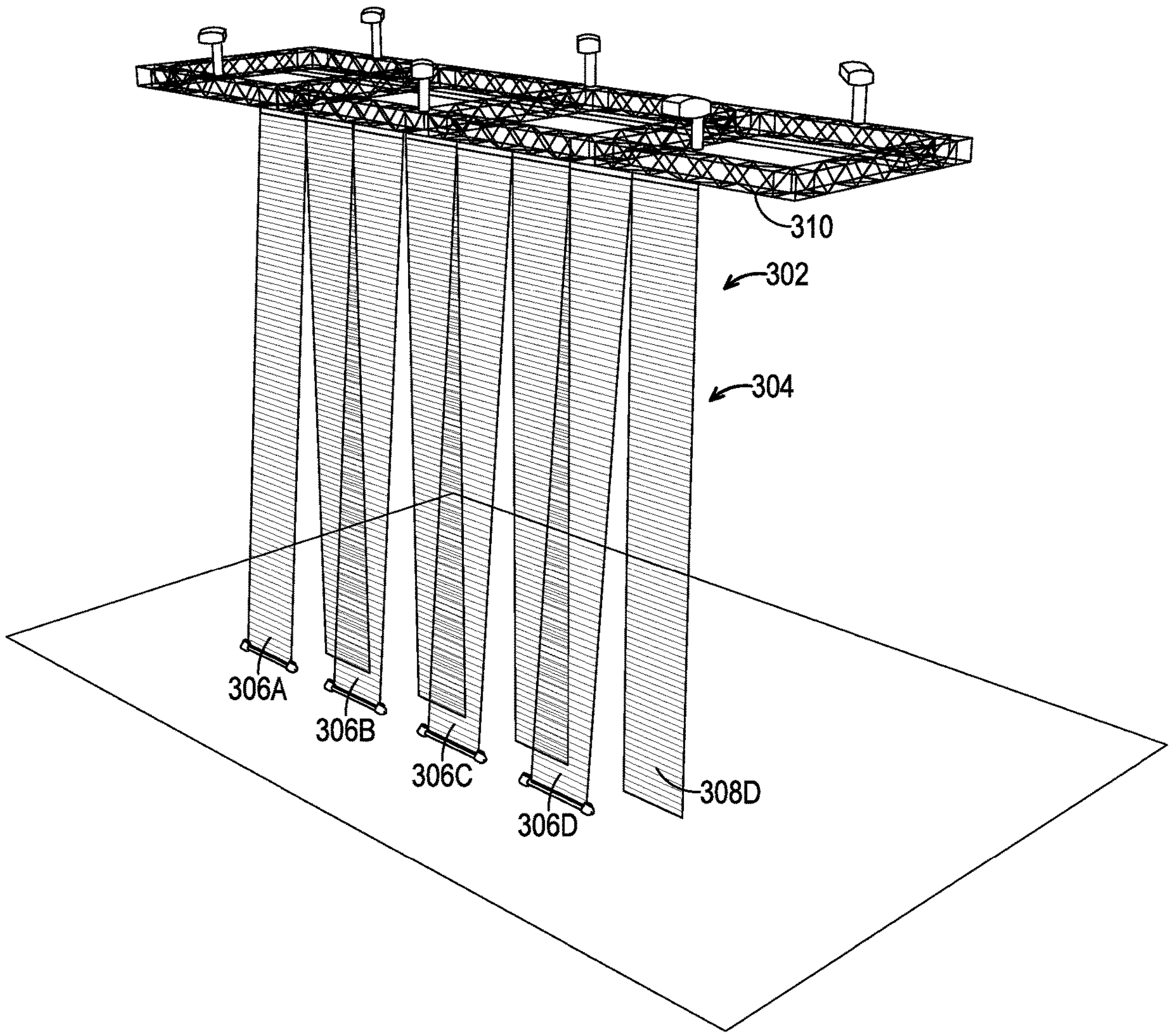
FIG. 6 is a perspective view of the system of FIG. 5.
Figure 7:
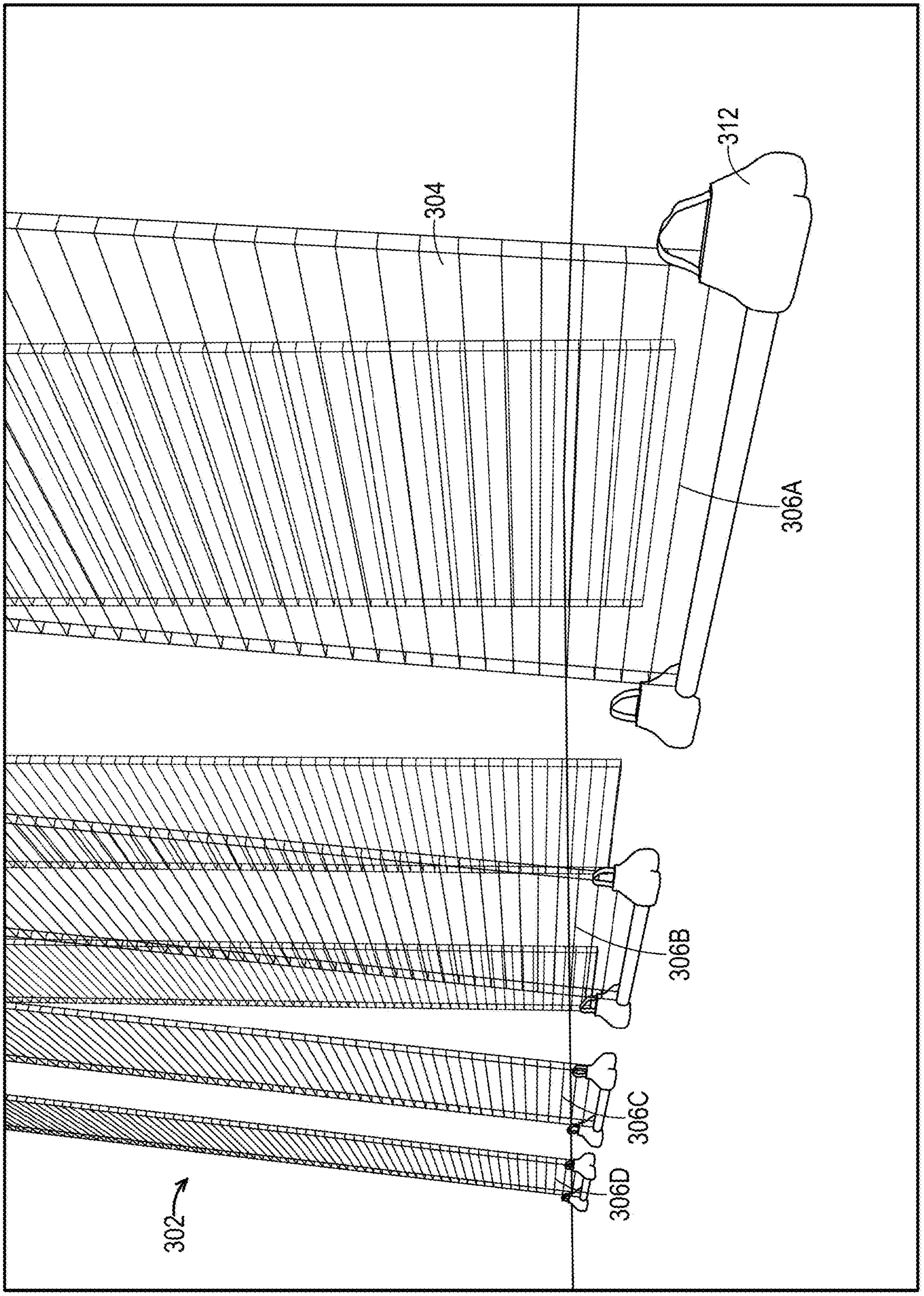
FIG. 7 is another perspective view of the sound management system of FIG. 5.

As shown in FIGS. 5-7, this section describes an illustrative audio or sound management system 302. Sound management system 302 is an example of sound management system 102 described above.

Sound management system 302 is configured to be used in a virtual production volume to improve dialogue capture within the virtual production volume. As shown in FIGS. 5-7, sound management system 302 includes an acoustic baffle curtain 304 having a surface geometry that varies along the length of the acoustic baffle curtain. The variable surface geometry of baffle curtain 304 facilitates improved sound wave absorption and/or diffusion by the baffle curtain. Baffle curtain 304 is configured to be disposed in front of an LED wall or other sound reflective surface of the virtual production volume to block sound waves from reflecting off the surface of the LED wall. Any suitable number of baffle curtains 304 may be used in a virtual production volume to improve sound capture within the virtual production volume.

Baffle curtain 304 may be configured in any suitable way such that a surface of the baffle curtain has a variable surface geometry. For example, as shown in FIGS. 5-7, baffle curtain 304 includes a plurality of curtain sections including anchored or ballasted curtain sections 306A-D, and free-hanging curtain sections 308A-D. The free-hanging curtain sections 308D are configured to hang generally vertically, while the anchored curtain sections 306A-D are held at an oblique angle relative to the ground (e.g., non-vertically), such that the collective surface of baffle curtain 304 has the variable surface geometry. The variable surface geometry of baffle curtain 304 facilitates sound wave absorption and/or diffusion by baffle 304.

In this example, both the free hanging curtain sections and the anchored curtain sections are coupled at a top end to curtain rail 310. Free hanging curtain sections 308A-D hang from curtain rail 310 freely and are not anchored to the ground. Thus, free hanging curtain sections 308A-D are generally orthogonal to a horizontal plane representing the ground or stage floor. Anchored curtain sections 306A-D are anchored or ballasted at a bottom end to the ground, such that ballasted curtain sections 306A-D are held at an oblique angle relative to the ground. As shown in FIGS. 5-7, baffle 304 includes alternating anchored curtain sections and free hanging curtain sections, such that the surface of baffle 304 has alternating curtain sections disposed at different angles to the ground. However, baffle 304 may include any suitable number and configuration of anchored and free hanging curtain sections.

Anchored curtain sections 306A-D may be anchored or ballasted to the ground by any suitable mechanism. For example, as shown in FIG. 7, anchored curtain sections 306A-D may be ballasted to the ground by sandbags 312. Anchored curtain sections 306A-D may be attached to sandbags by velcro, and/or any suitable mechanism. Anchored curtain sections 306A-D may be anchored at any suitable angle to facilitate sound absorption by baffle curtain 304.

Anchored curtain sections 306A-D and free hanging curtain sections 308A-D comprise a clear, transparent material configured to absorb and/or diffuse sound waves. For example, As shown in FIGS. 6 and 7, the curtain sections comprise a transparent material having a non-planar and/or textured surface configured to improve sound absorption. The curtain sections may comprise a fire-resistant material.

D. Third Illustrative Audio Management System

Figure 8:
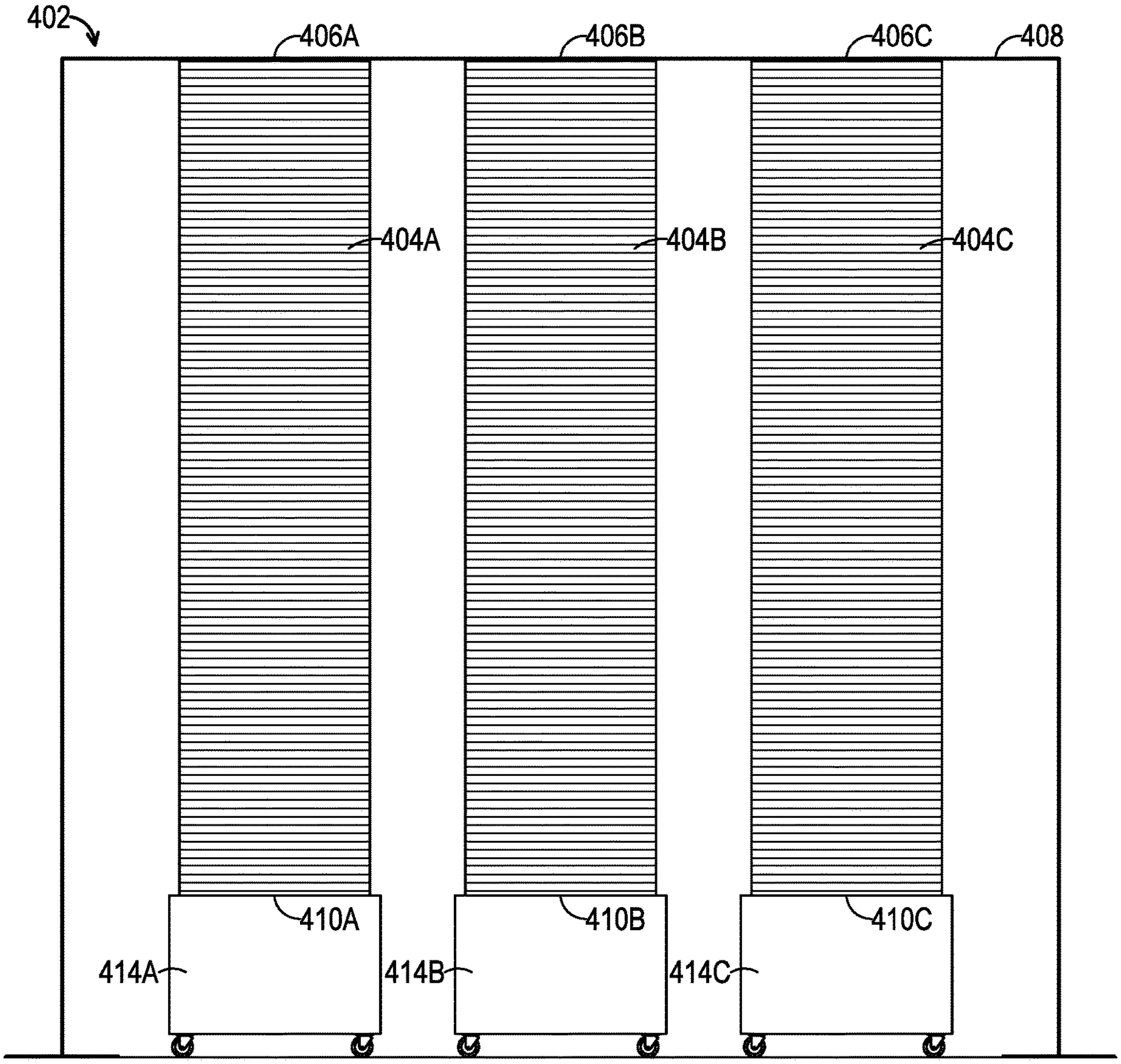
FIG. 8 is a schematic diagram of a third illustrative sound management system in accordance with aspects of the present disclosure.
Figure 9:
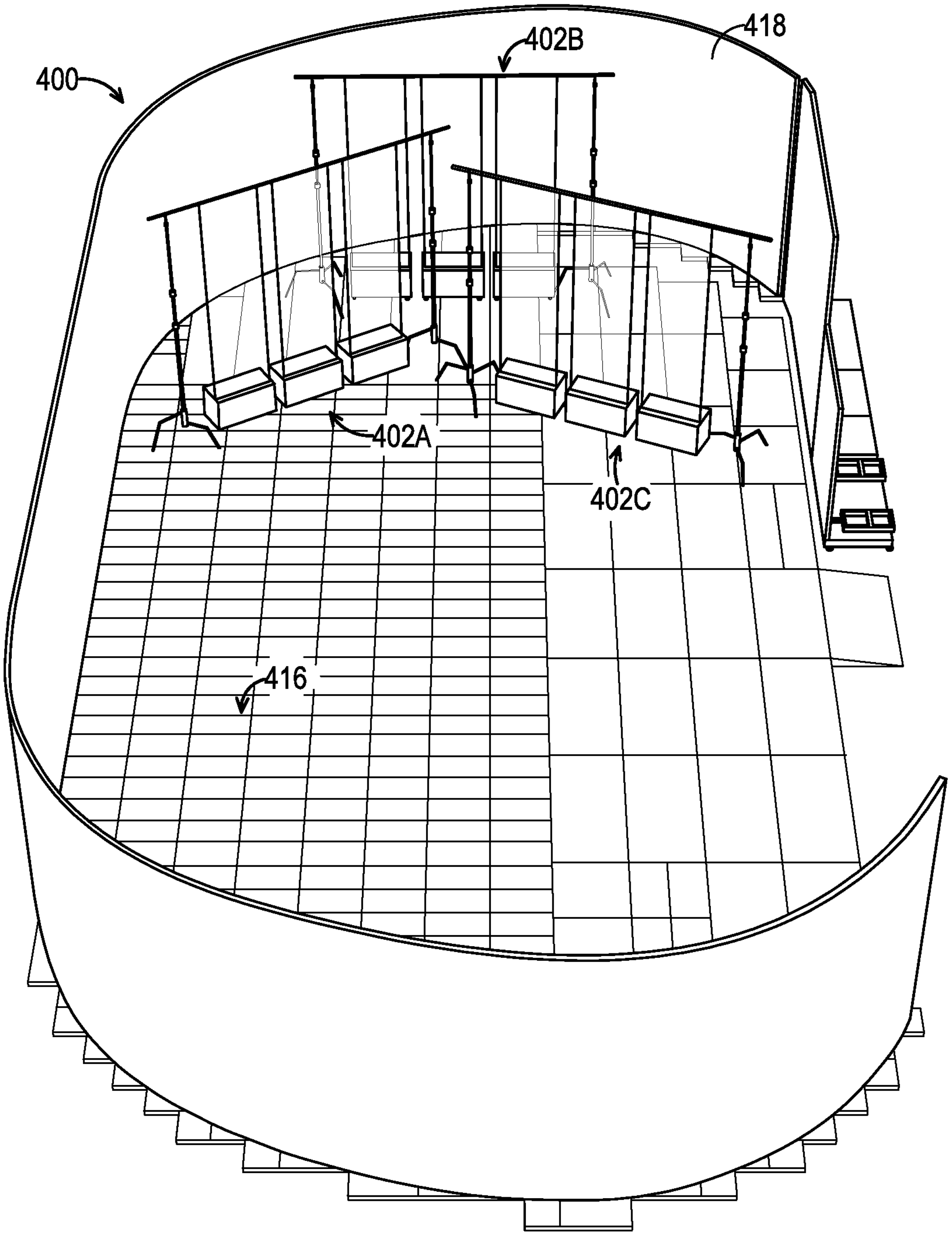
FIG. 9 is a perspective view of the sound management system of FIG. 8 including an illustrative virtual production volume.
Figure 10:
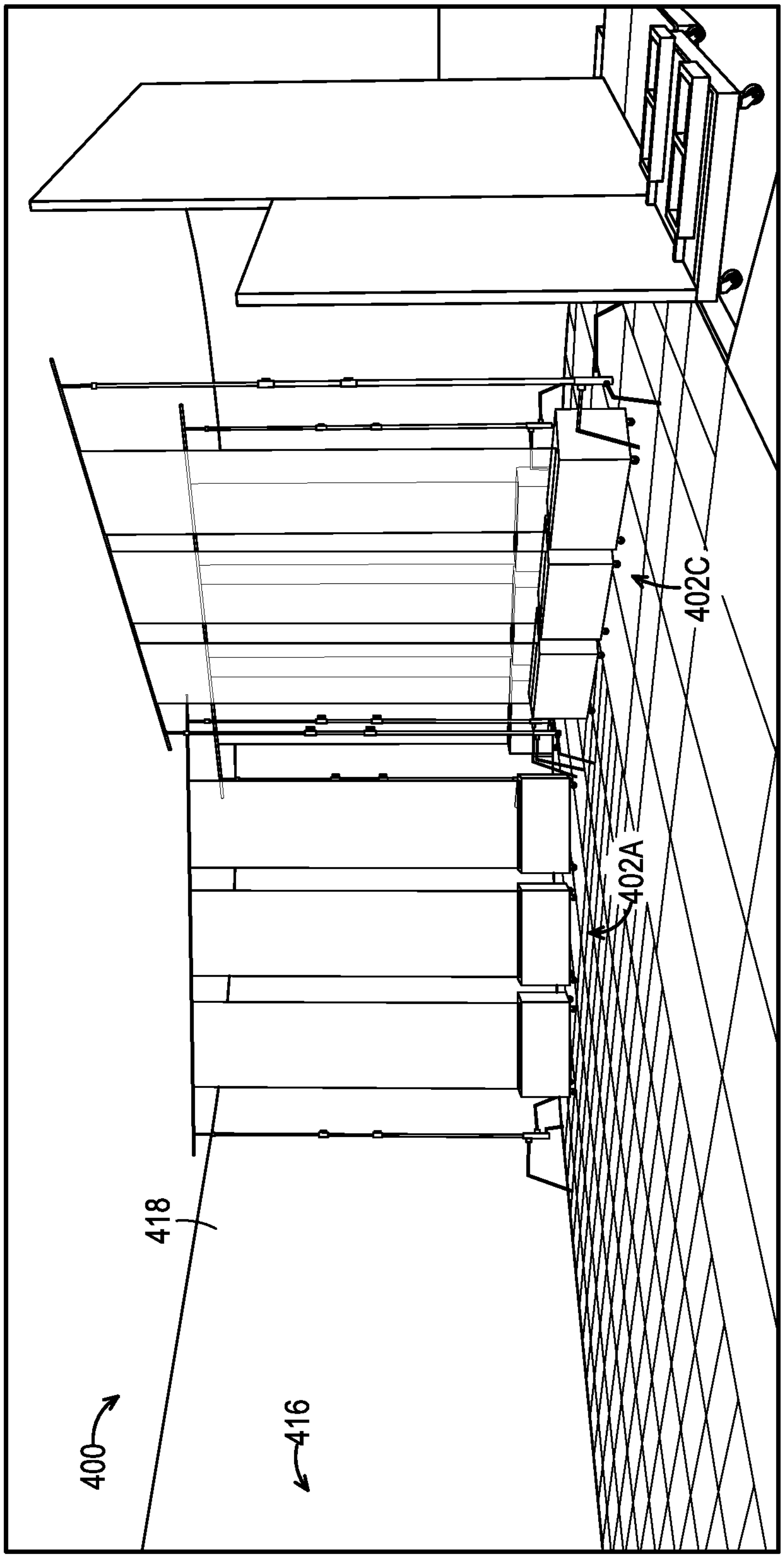
FIG. 10 is another perspective view of the sound management system of FIG. 8.

As shown in FIGS. 8-10, this section describes an illustrative sound management system 402. Sound management system 402 is an example of sound management system 102 described above.

Sound management system 402 is configured to be used in a virtual production volume 400 to improve dialogue capture within the virtual production volume. System 402 includes a plurality of baffle curtain sections 404A-C each configured to absorb, diffuse, and/or baffle sound waves. As shown in FIGS. 9 and 10, multiple sound management systems 402A-C may be used in the virtual production volume.

Sound management system 402 is configured to have a portable design, such that sound management system 402 is easily moved to different locations within the virtual production volume. To accomplish this, baffle curtain sections 404A-C may be coupled to one or more moveable frames configured to permit repositioning and/or relocation of the structure within the virtual production volume. For example, as shown in FIGS. 8-10, sound management system 402 may include a plurality of baffle curtain sections 404A-C disposed adjacent one another and coupled to a moveable stand 408. Each of the baffle curtain sections 404A-C is configured to absorb and/or to diffuse sound waves incident on the curtain section. Baffle curtain sections 404A-C are each coupled at a top end 406A-C to moveable stand 408 having a top horizontal bar coupled at each end to a leg. A bottom end 410A-C of each curtain section is coupled to a respective rolling box 414A-C. The moveable stand and the rolling boxes are configured to facilitate portability of the sound management system. Each baffle curtain section 406A-C may have any suitable dimensions. For example, baffle curtain sections 406A-C may each extend from near the top of an LED wall 418 to the rollable box 414A-C.

Virtual production volume 400 may include any suitable virtual production stage configured to be used for filming movies, tv shows, or other audiovisual content. For example, as shown in FIG. 9, virtual production volume 100 may include an LED wall 418 formed in an oblong shape having an opening on one side. As shown in FIGS. 9 and 10, three sound management systems 402A-C are used in virtual production volume 400. However, any suitable number of sound management systems may be used in the virtual production volume to facilitate improved sound capture. As shown in FIGS. 9 and 10, sound management systems 402A-C are positioned at different angles relative to performance area 416. Having multiple sound management systems disposed at different angles relative to the performance area may improve sound wave absorption. In some examples, as shown in FIG. 9, sound management systems 402A-C are disposed on an opposite side of the virtual production volume relative to performance area 416, such that sound management systems 402A-C avoid interfering with a background displayed on LED wall 418.

Curtain sections 404A-C may comprise any suitable material configured to absorb and/or diffuse sound waves incident on the curtain sections, and to allow light from LED wall 418 to pass through the curtain sections. For example, curtain sections 404A-C comprise a transparent nylon bubble wrap or a transparent vinyl material. In some examples, curtain sections 404A-C comprise a fire-resistant material. As shown in FIG. 8, curtain sections 404A-C have a ribbed surface texture configured to facilitate sound wave absorption.

F. Fourth, Fifth, and Sixth Illustrative Audio Management Systems

As shown in FIGS. 11-16, this section describes illustrative sound management systems 502, 602, and 702. Sound management systems 502, 602, and 702 are each an example of sound management system 102 described above.

Figure 11:
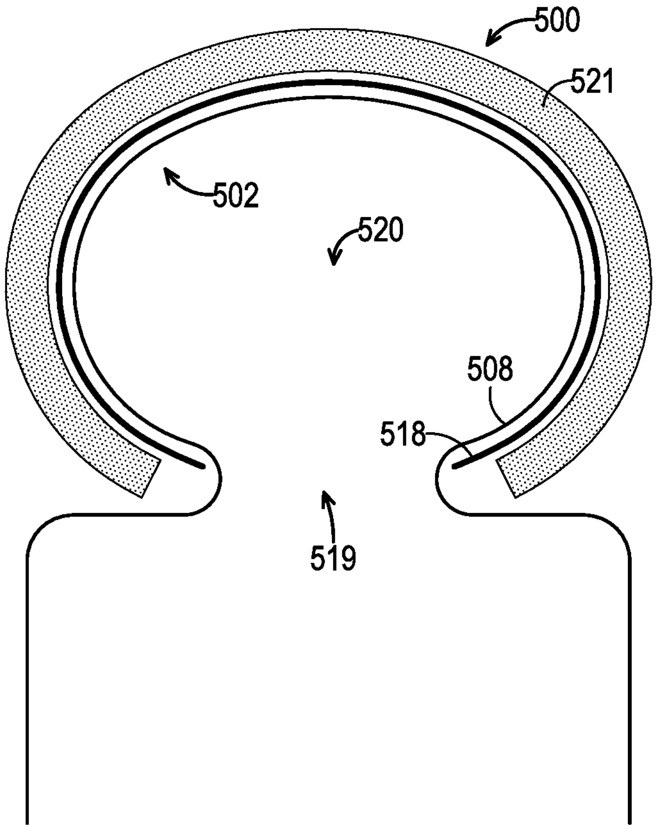
FIG. 11 is a schematic diagram of a fourth illustrative sound management system in accordance with aspects of the present disclosure.
Figure 12:
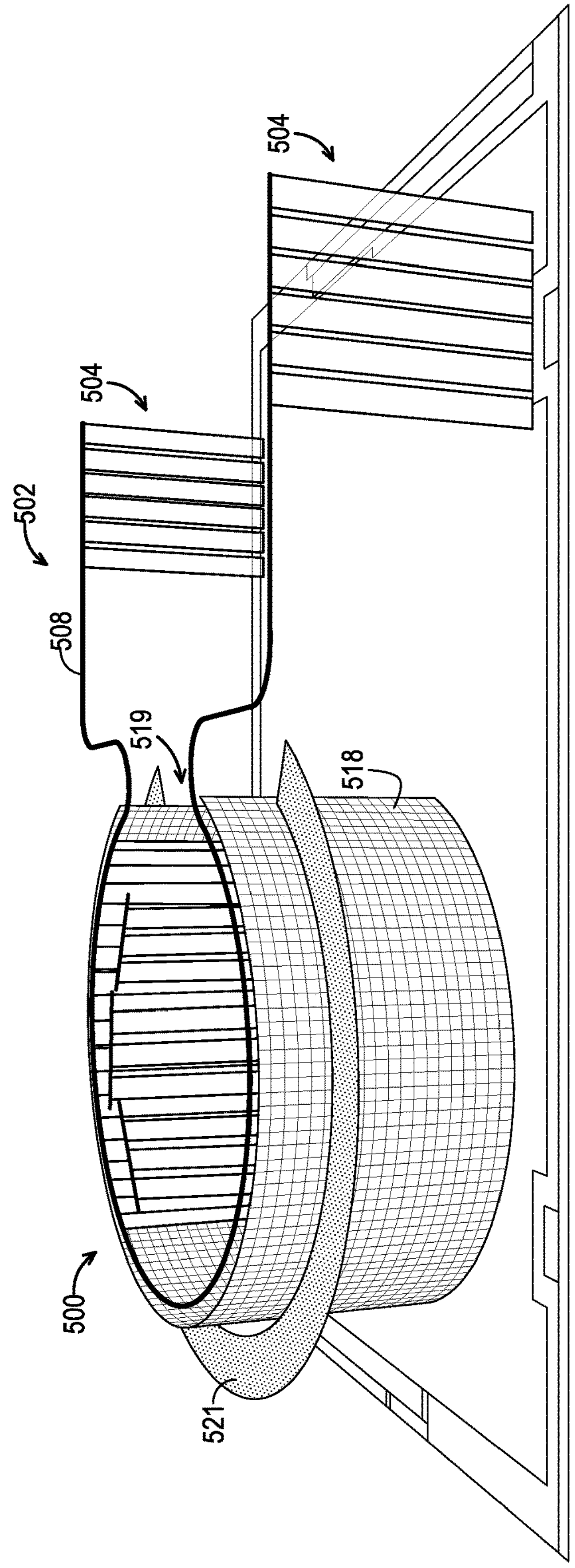
FIG. 12 is a perspective view of the illustrative sound management system of FIG. 11.

FIGS. 11 and 12 depict sound management system 502. Sound management system 502 is configured to be used in any suitable virtual production volume to improve dialogue capture within the virtual production volume. In the example of FIGS. 11 and 12, production volume 500 includes an LED wall 518 formed in an oblong shape having an opening 519 in one side of the LED wall. LED wall 518 partially encloses a stage area 520. LED wall 518 is configured to display a virtual background or setting (e.g., for real world actors) using a software or gaming engine (e.g., the Unreal engine), such that actors performing in stage area 520 of the virtual production volume can see the visual content. Production volume 500 includes a mezzanine 521 disposed around an outer periphery of LED wall 518.

Virtual production volume 500 may have any suitable dimensions for use in filming tv shows, movies, etc. In some examples, LED wall 518 is approximately 30 feet tall. The large size of virtual production volume 500 and the sound reflective surfaces of LED wall 518 may cause echo and sound reverberation within the volume. As a result, it may be difficult to capture high quality sound recordings of dialog spoken by performers within the virtual production volume.

System 502 is configured to absorb sound waves and/or diffuse sound waves to reduce sound reverberation within the virtual production volume. System 502 includes one or more baffle curtains 504. Baffle curtains 504 are configured to absorb sound waves and/or diffuse sound waves out of the virtual production volume, and thus reduce sound reverberation within the virtual production volume. Put another way, baffle curtains 504A-B are configured to block sound waves incident on baffle curtains 504A-C, such that the sound waves do not reflect off the surface of LED wall 518.

Baffle curtains 504 comprise a transparent material to facilitate light from the LED wall passing through the baffle curtain to the stage area. The baffle curtains may comprise a material that is highly transmissive with respect to visible light. For example, the material may have a transmittance of 90% or more with respect to visible light. In some examples, materials are utilized having a transmittance of at least 25%, at least 50%, or at least 75% with respect to visible light.

In some examples, as shown in FIG. 12, baffle curtains 504 comprise a plurality of baffle curtain sections. One or more of the baffle curtain sections may be held at an oblique angle (i.e., non-vertically) relative to the floor of the production volume and/or one or more of the baffle curtain sections may hang freely (i.e., vertically). In some examples, anchored and free hanging curtain sections may alternate along a length of baffle curtain 504, such that a surface geometry of baffle curtain 504 varies from section to section. The variable surface geometry facilitates improved sound wave absorption by baffles 504A-B.

System 502 may include any suitable number of baffle curtains 504 and baffle curtains 504 may have any suitable dimensions for use in the virtual production volume. In some examples, baffle curtains 504 are configured to extend substantially from a top of LED wall 518 to, or near to a ground of the virtual production volume.

Sound management system 502 includes a curtain rail 508 and a top end of baffle curtains 504 are coupled to the curtain rail. Baffle curtains 504 may be coupled to curtain rail 508 in any suitable manner, such that baffle curtains 504 are configured to slide along curtain rail 508 to different positions within the production volume. For example, the top end of baffle curtains 504 may be coupled to curtain rail 508 by a plurality of slidable attachment pieces, as depicted in FIG. 2.

As shown in FIG. 11, curtain rail 508 extends around an internal periphery of LED wall 518 and extends out of production volume 500 on each side of opening 519 in LED wall 518. This configuration facilitates selectively positioning baffle curtains 504 at any suitable position in front of LED wall 518 and moving the baffle curtains out of the virtual production volume when the baffle curtains are not in use, as shown in FIG. 12. Curtain rail 508 may be positioned any suitable distance inside of LED wall 518. For example, curtain rail 508 may be positioned, such that baffle curtains 504 hang from curtain rail 508 2 to 3 feet in front of the LED wall.

Figure 13:
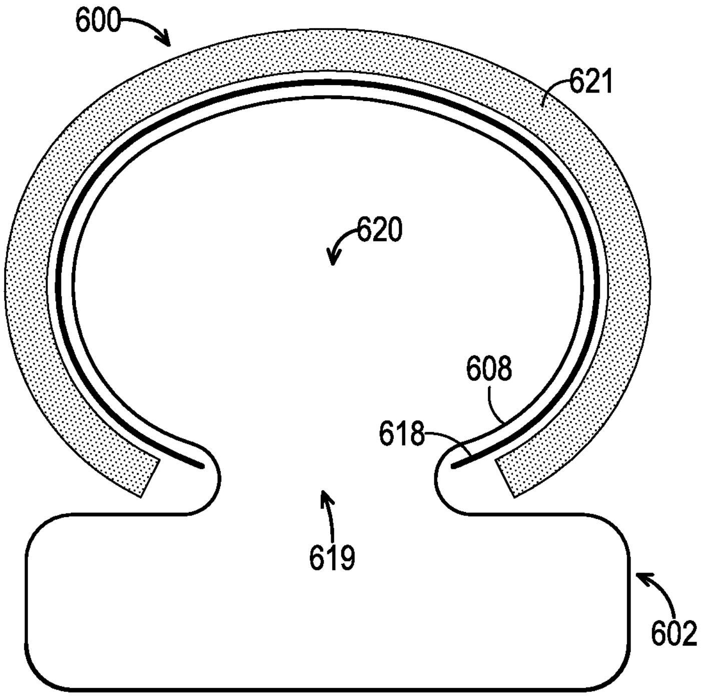
FIG. 13 is a schematic diagram of a fifth illustrative sound management system in accordance with aspects of the present disclosure.
Figure 14:
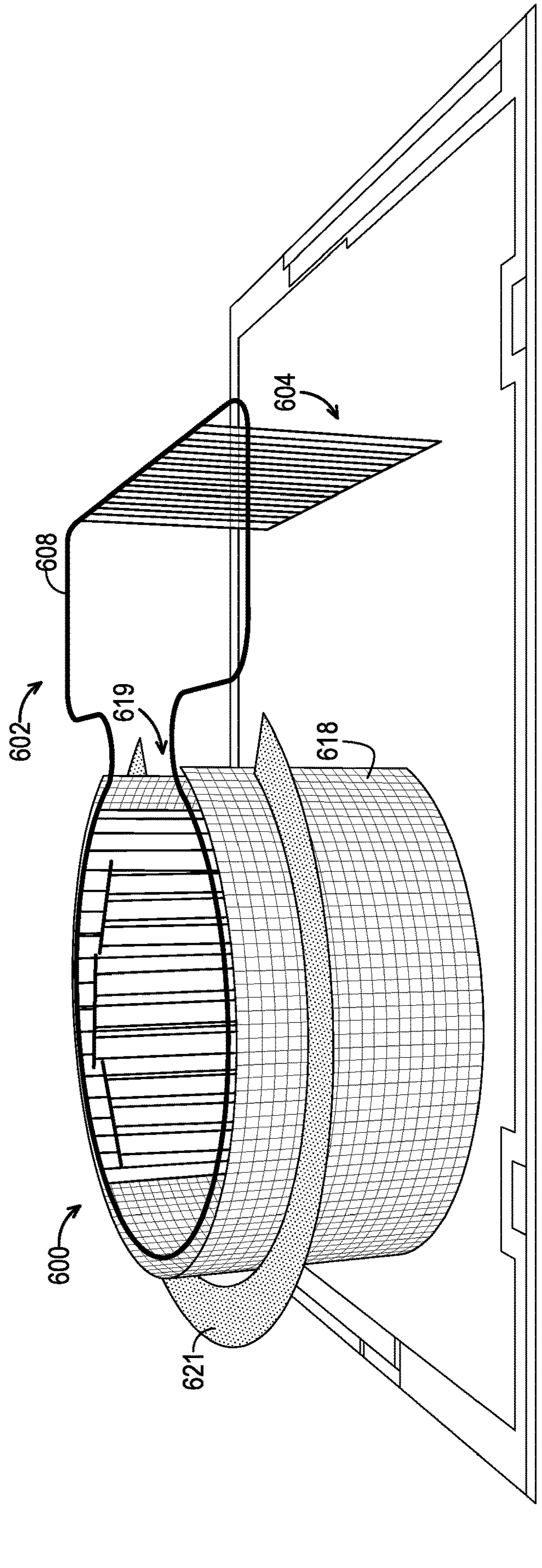
FIG. 14 is a perspective view of the illustrative sound management system of FIG. 13.

FIGS. 13 and 14 depict an illustrative sound management system 602 configured to be utilized to improve sound capture in a virtual production volume 600. Virtual production volume 600 is substantially similar to production volume 500, described above. Production volume 600 includes an LED wall 618 formed in an oblong shape and having an opening 619 in a side of the LED wall. LED wall 618 partially encloses a stage area 620 in which performers may act in front of LED wall 618. Production volume 600 includes a mezzanine 621 disposed around the periphery of LED wall 618.

Sound management system 602 includes a baffle curtain 604 hanging from a curtain track 608. System 602 may include any suitable number of baffle curtains 604 hanging from curtain track 608. Baffle curtain 604 may be substantially similar to baffle curtain 504 and may have any of the features and/or properties described herein with regard to baffle curtains of the present disclosure.

Curtain track 608 of system 602 has a different shape than the shape of curtain track 508. As shown in FIG. 13, curtain track 608 extends around the periphery of LED wall 618 and out of opening 619 in the side of LED wall 618. The portion of curtain track 608 that is disposed outside of the production volume 600 forms a closed loop. As shown in FIG. 14, baffle curtain 604 may be moved to a position on closed loop, such that baffle curtain 604 is adjacent opening 619 in the LED wall 618. This facilitates utilizing baffle curtain 604 as a room divider that is configured to block sounds from entering production volume 600 from outside of the production volume. Curtain track 608 extends around the entire periphery of LED wall 618 and is disposed on the internal side of LED wall 618 to facilitate the selective positioning of baffle curtain 604 at any suitable position within production volume 600 between LED wall 618 and stage area 620. In some examples, rather than extending out of production volume 600, curtain track 608 forms a closed loop inside of production volume 600. For example, curtain track 608 may form a closed loop having an oblong shape matching the shape of LED wall 618.

Figure 15:
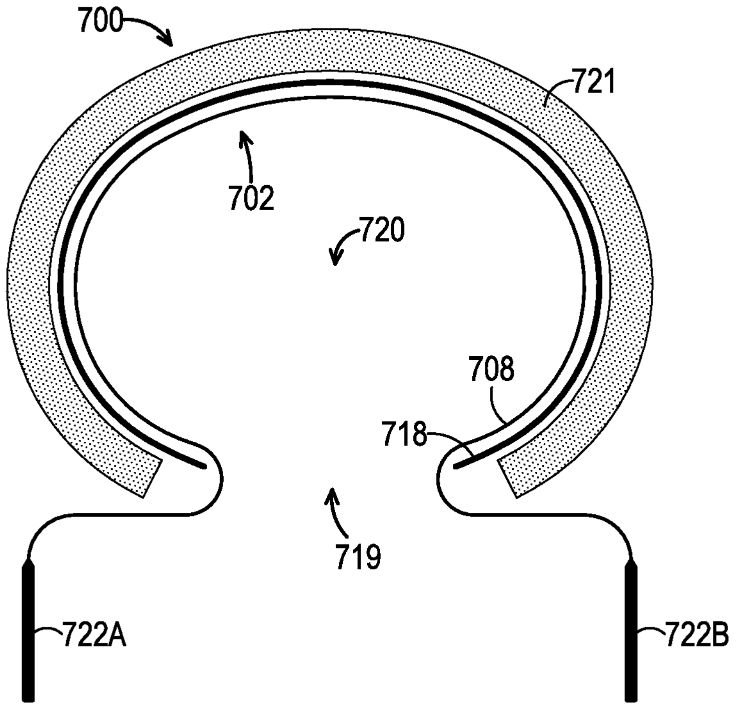
FIG. 15 is a schematic diagram of a sixth illustrative sound management system in accordance with aspects of the present disclosure.
Figure 16:
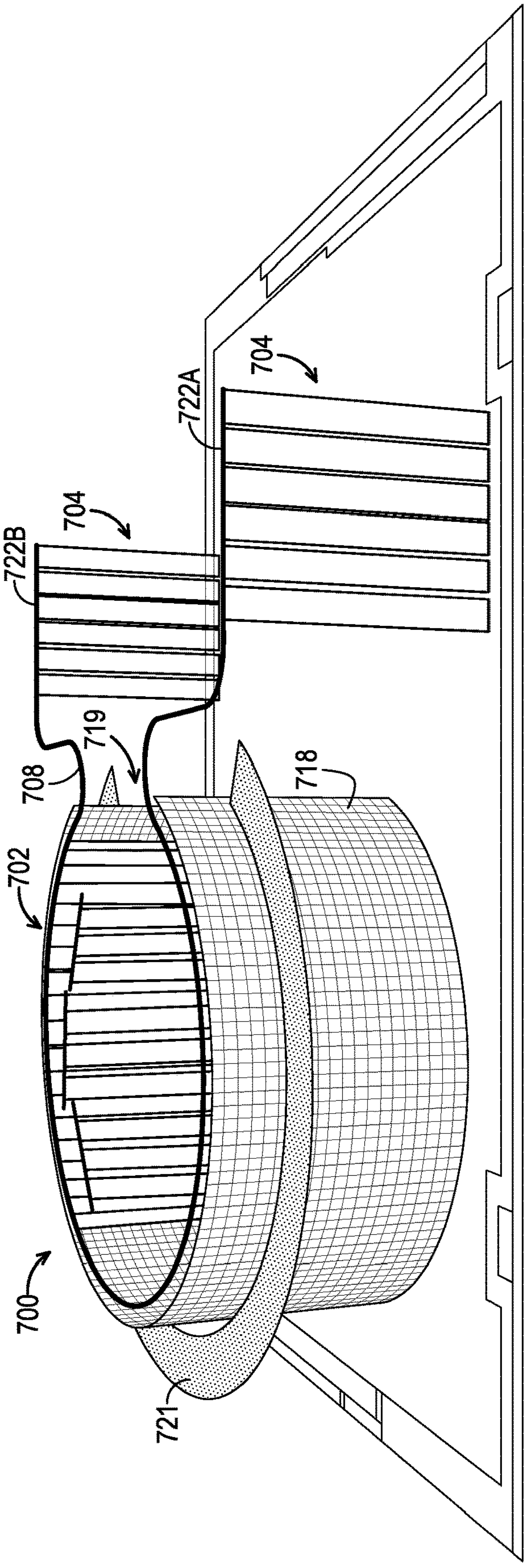
FIG. 16 is a perspective view of the illustrative sound management system of FIG. 15.
Figure 17:
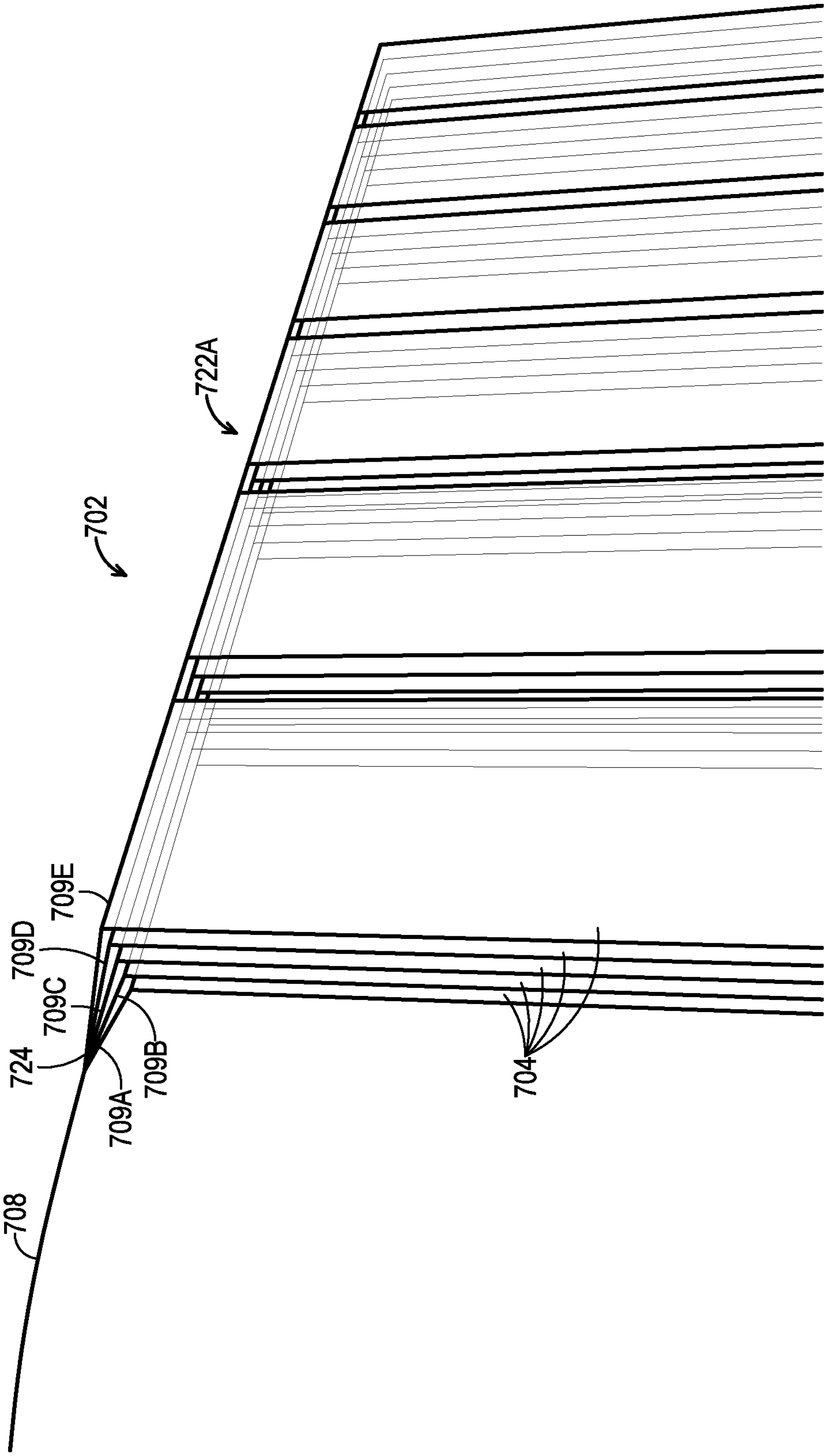
FIG. 17 is a perspective view of a storage dock of the illustrative sound management system of FIG. 15.

FIGS. 15, 16, and 17 depict an illustrative sound management system 702 configured to be utilized to improve sound capture in a virtual production volume 700. Virtual production volume 700 is substantially similar to production volumes 500 and 600, described above. Production volume 700 includes an LED wall 718 formed in an oblong shape and having an opening 719 in a side of the LED wall. LED wall 718 partially encloses a stage area 720. Production volume 700 includes a mezzanine 721 disposed around the periphery of LED wall 718.

Sound management system 702 includes one or more baffle curtains 704 hanging from a curtain track 708. System 702 may include any suitable number of baffle curtains 704 hanging from curtain track 708. Baffle curtain 704 may be substantially similar to baffle curtains 504 and 604 and may have any of the features and/or properties described herein with regard to baffle curtains of the present teachings.

As shown in FIG. 15, curtain track 708 extends around the internal periphery of LED wall 718, such that baffle curtains 704 may be selectively positioned in front of LED wall 718. Curtain track 708 extends out of opening 719 on LED wall on each side of opening 719. As shown in FIG. 16, the portion of curtain track 708 that is disposed outside of the production volume includes a pair of baffle curtain storage docks 722A, 722B disposed outside of production volume 700. As shown in FIG. 17 depicting storage dock 722A, curtain track 708 splits into a plurality of separate docking tracks 709A, 709B, 709C, 709D, and 709E disposed adjacent to each other. One or more baffle curtains 704 may be stored on each of docking tracks 709A-E when not in use in the production volume. When the baffle curtains are needed in the production volume, the baffle curtains may be moved from docking tracks 722A-E onto curtain track 708 to be positioned within the production volume. Storage dock 722B is substantially similar to storage dock 722A, described above. Storage docks 722A-B may each include any suitable number of the docking tracks for storing the baffle curtains.

Storage docks 722A-B may include a switch track mechanism 724 configured to facilitate switching baffle curtains 704 from curtain track 708 onto any one of docking tracks 709A-E to be stored when not in use. Switch track mechanism 724 may comprise any suitable mechanism configured to facilitate switching baffle curtains from curtain track 708 to any of docking tracks 709A-E and switching baffle curtains from docking tracks 709A-E to curtain track 708.

G. Seventh Illustrative Audio Management System

Figure 18:
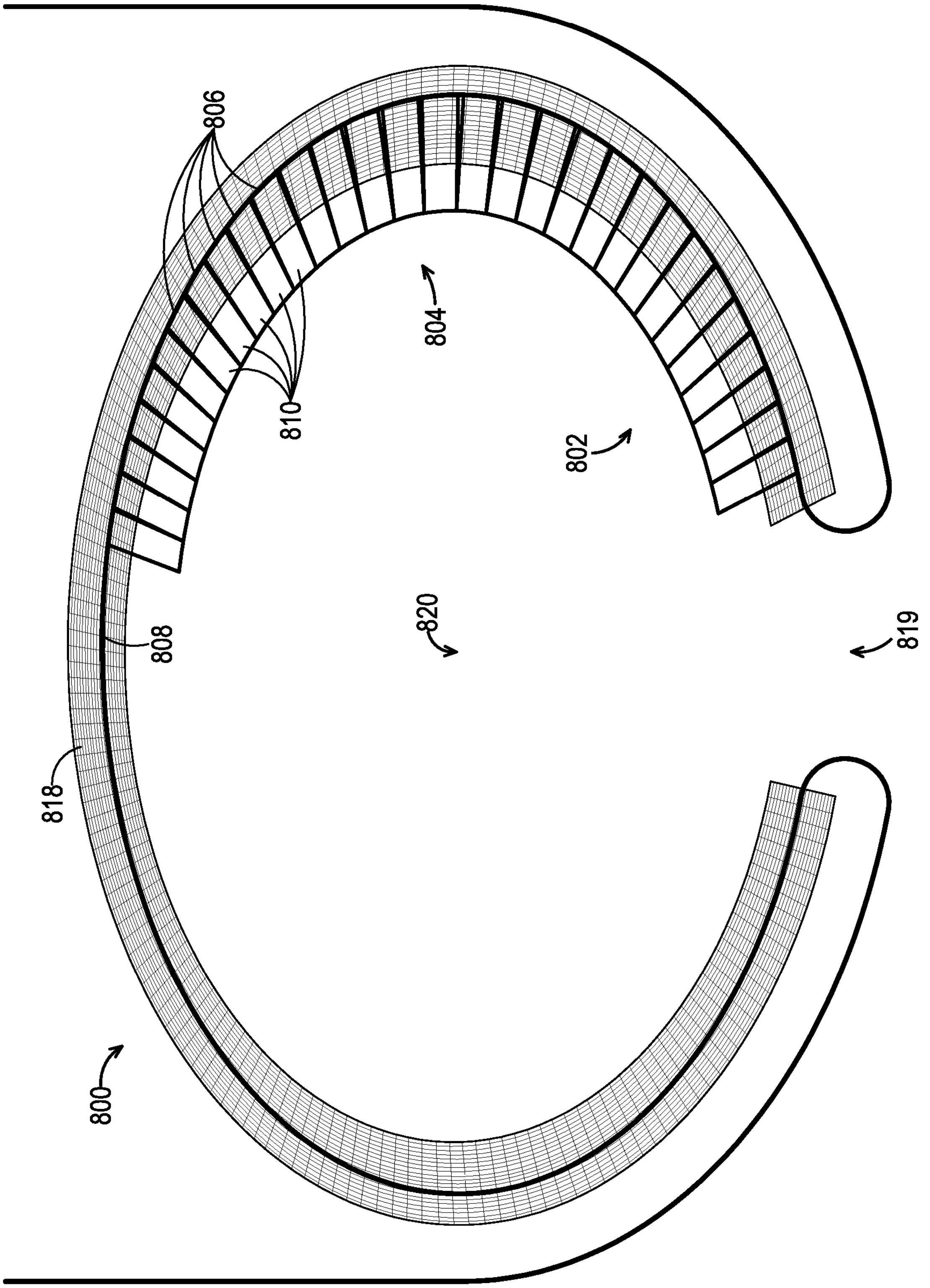
FIG. 18 is a top view of a seventh illustrative sound management system in accordance with aspects of the present disclosure.
Figure 19:
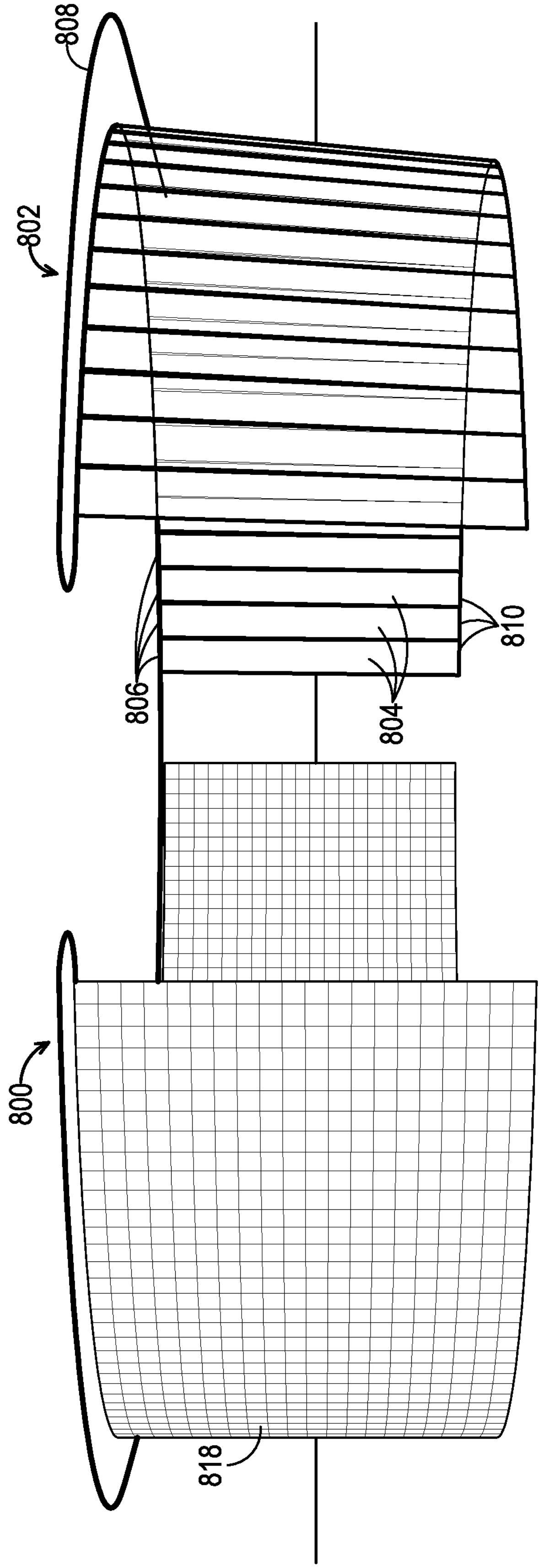
FIG. 19 is a perspective view of the illustrative sound management system of FIG. 18.
Figure 20:
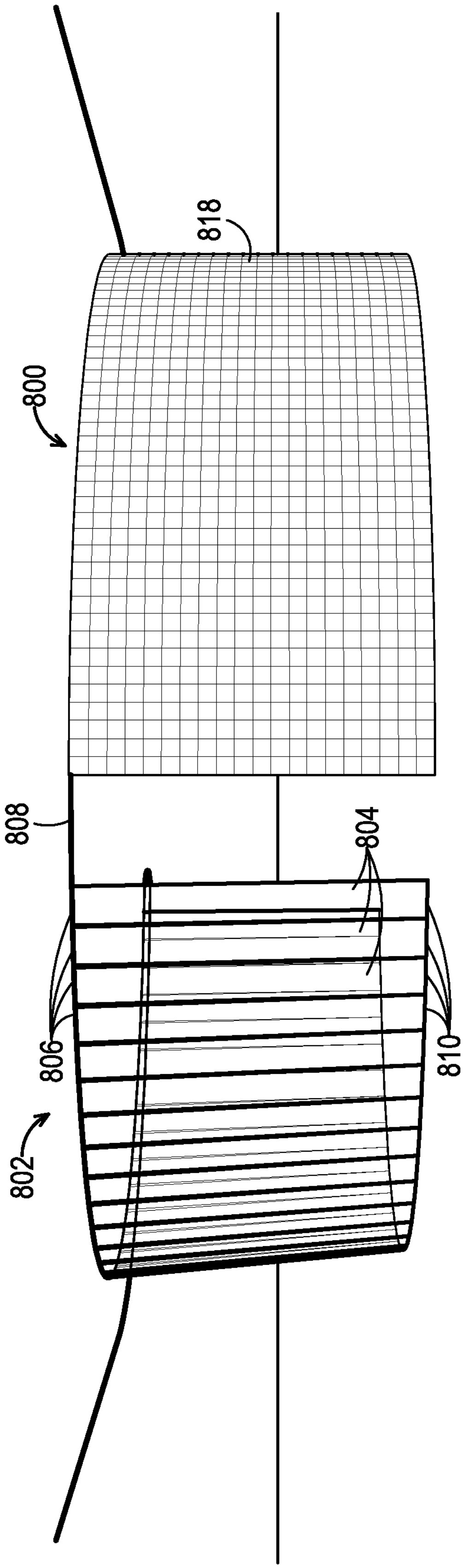
FIG. 20 is a perspective view of the illustrative sound management system of FIG. 18.

As shown in FIGS. 18-20, this section describes illustrative sound management systems 802. Sound management system 802 is an example of sound management system 102 described above.

FIGS. 18-20 depict sound management system 802. Sound management system 802 is configured to be used in a virtual production volume 800 to improve dialogue capture within the virtual production volume. As shown in FIG. 18, production volume 800 includes an LED wall 818 formed in an oblong shape having an opening 819 on one side of the LED wall. LED wall 818 partially encloses a stage area 820. LED wall 818 is configured to display a virtual background or setting (e.g., for real world actors) using a software or gaming engine (e.g., the Unreal engine), such that actors performing in the stage area of the virtual production volume can see the visual content.

System 802 is configured to reduce sound reverberation within virtual production volume 800. System 802 includes a plurality of baffle curtain sections 804. Each baffle curtain section 804 may have any of the features and/or properties described herein with respect to baffle curtains of the present teachings. For example, baffle curtain sections 804 may comprise a material that is at least partially transmissive with respect to visible light. Baffle curtain sections 804 may comprise a material having a transmittance of at least 25%, at least 50%, or at least 75% and/or any other suitable transmittance with respect to visible light. Baffle curtain sections 804 may comprise a material having a non-planar surface (e.g., a textured surface). For example, the surface of baffle curtain 804 may have a ribbed texture. The non-planar surface of baffle curtain 804 facilitates improved baffling of sound waves incident on baffle curtain 804.

FIG. 18 depicts a top view of system 802 and production volume 804. FIGS. 19 and 20 depict side perspective views of system 802. In FIGS. 19 and 20 a portion of LED wall 818 is not shown in order to more clearly depict the components of system 802.

As shown in FIGS. 18-20, a top end 806 of each baffle curtain section 804 is slidably coupled to a curtain rail 808. Each baffle curtain section 804 is hanging from curtain track 808 at an angle (i.e., non-vertically), such that a bottom end 810 of each baffle curtain section 804 is disposed further on an interior side of LED wall 818 than a top end 806 of the respective baffle curtain section. For example, top end 806 of each baffle curtain section 804 may be disposed 3 feet in front of LED wall 818 and bottom end 810 of each baffle curtain section 804 may be disposed 6 feet in front of the LED wall. In some examples, each baffle curtain section 804 hangs from curtain track 808 at a same angle as each other baffle curtain section. In some examples, one or more of the baffle curtain sections 804 hang at a different angle than one or more of the other baffle curtain sections. The baffle curtain sections 804 may be angled, such that collectively the baffle curtain sections form at least a portion of an inverted conical frustum. Angling the baffle curtain sections in the above-described manner facilitates directing sound waves upward and away from dialogue microphones which may be disposed in a lower portion of the virtual production volume.

Each of baffle curtain sections 804 may be anchored and/or ballasted to the floor of the production volume at the desired angle by any suitable mechanism, e.g., a sandbag. In some examples, the bottom of each baffle curtain section 804 is raised off the floor of the virtual production volume by 2" and/or any other suitable distance.

LED wall 818 of the virtual production volume may be any suitable size and curtain track 808 may hang from the ceiling at any suitable height. As a specific example, LED wall 818 of the Virtual Production Volume may be approximately 32' 10" tall and curtain track 808 may have a height of approximately 33' tall. Curtain track 808 may be disposed in front of the LED wall by any suitable distance. For example, the curtain track may be disposed approximately 3' in front of the LED wall. Baffle curtain sections 804 may hang from curtain rail 808 at any suitable angle configured to facilitate directing upward and away from a floor of the virtual production volume. As a specific example, the baffle curtain sections may be angled approximately 5 degrees away from the LED screen, such that the bottom of each baffle curtain section is disposed approximately 6' in front of the LED screen and the top of each curtain section is disposed approximately 3' feet in front of the LED screen.

H. Eighth Illustrative Audio Management System

Figure 21:
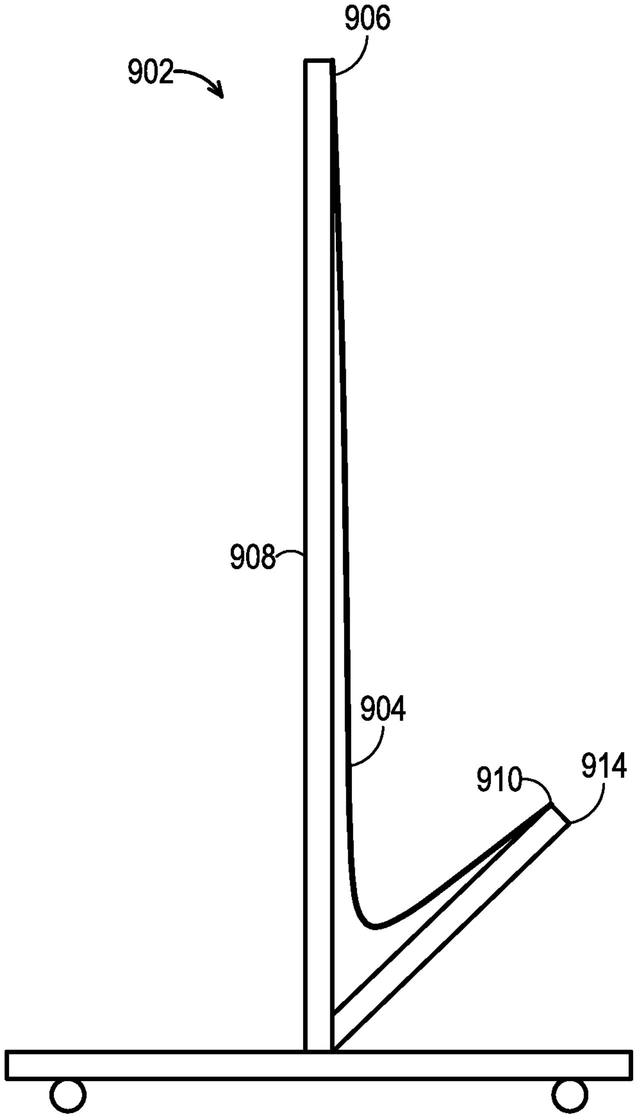
FIG. 21 is a schematic diagram depicting an eighth illustrative sound management system in a storage configuration in accordance with aspects of the present disclosure.
Figure 22:
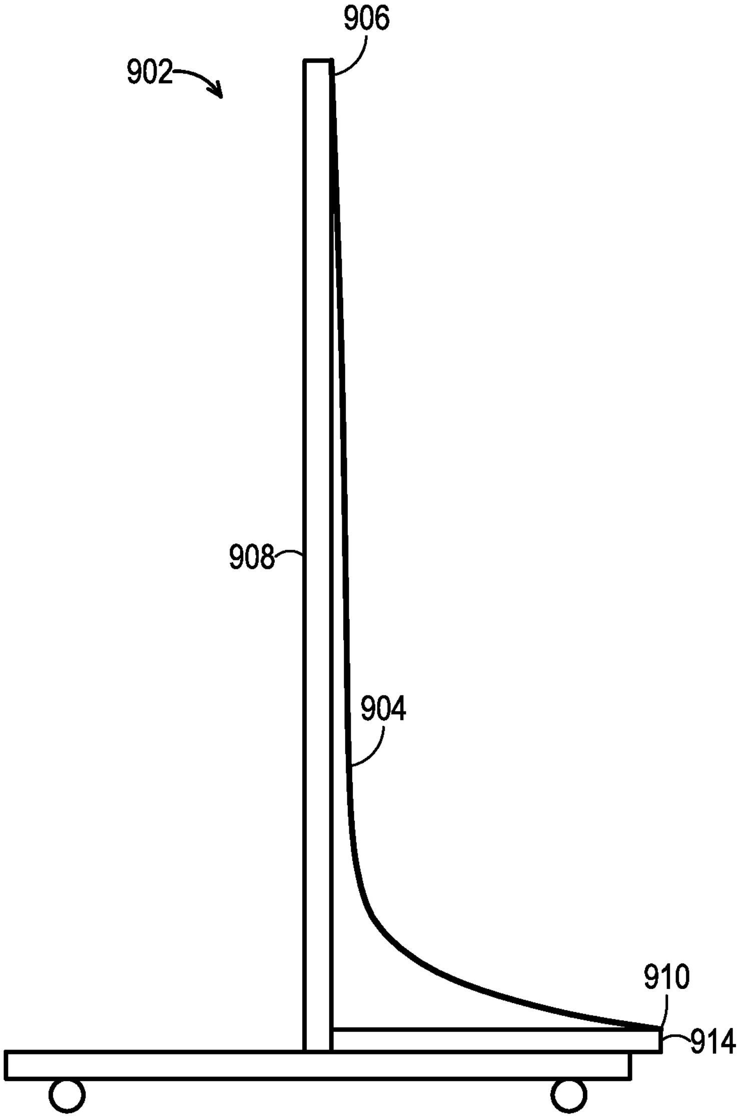
FIG. 22 is a schematic diagram depicting the illustrative sound management system of FIG. 21 in a deployed configuration.

As shown in FIGS. 21-22, this section describes illustrative sound management system 902. Sound management system 902 is an example of sound management system 102 described above.

Sound management system 902 is configured to have a portable design, such that sound management system 902 is easily moved to different locations within a virtual production volume. To accomplish this, a baffle curtain 904 is coupled to a moveable frame 908 configured to permit repositioning and/or relocation of the structure within the virtual production volume. Baffle curtain 904 is configured to absorb and/or diffuse sound waves incident on the curtain section. Frame 908 may be moved to any suitable position within a virtual production volume to selectively position baffle curtain 904 within the production volume. For example, frame 908 may be positioned, such that baffle curtain 904 is disposed between a portion of a display wall of the production volume and a stage area of the production volume. As such, baffle curtain is configured to reduce sound reverberation within the production volume by preventing sound waves that are produced in the stage area from reaching and reverberating off of the sound reflective surfaces of the display wall.

Baffle curtain 904 has a top end 906 coupled to moveable stand 908 and a bottom end 910 coupled to a pivotable ballasting mechanism 914. Pivotable ballasting mechanism 914 is pivotably coupled to portable stand 908 (e.g., hinged) and configured to transition the baffle curtain between a deployed position (depicted in FIG. 22) and a storage position (depicted in FIG. 21). In the deployed position (depicted in FIG. 22), the baffle curtain extends to a ground and/or proximate the ground of the production volume. In the storage position (depicted in FIG. 21), the ballasting mechanism is pivoted upwards, such that the baffle curtain is moved away from the ground of the production volume and the portable stand is more easily transportable.

Baffle curtain 904 and portable stand 908 may have any suitable dimensions configured for use in the virtual production volume. For example, portable stand 908 may have a same height or a height greater than the display of wall of the virtual production volume. As shown in FIG. 22, baffle curtain 904 may have a length that is greater than the height of portable stand 908, such that baffle curtain 904 is configured to curve outward at a bottom end. The curve of baffle curtain 904 facilitates directing sound waves upward away from microphones disposed on a floor of the virtual production volume.

Baffle curtain 904 may have any of the features and/or properties described herein with regard to baffle curtains of the present teachings. For example, baffle curtain 904 may comprise a material that is at least partially transmissive with respect to visible light. Baffle curtain may comprise a material having a transmittance of at least 25%, at least 50%, or at least 75% and/or any other suitable transmittance with respect to visible light. Baffle curtain 904 may comprise a material having a non-planar surface (e.g., a textured surface). For example, the surface of baffle curtain 904 may have a ribbed texture. The non-planar surface of baffle curtain 904 facilitates improved absorption and/or diffusion of sound waves incident on baffle curtain 904.

I. Illustrative Combinations and Additional Examples

This section describes additional aspects and features of a system for improving audio capture in a reflective environment, presented without limitation as a series of paragraphs, some or all of which may be alphanumerically designated for clarity and efficiency. Each of these paragraphs can be combined with one or more other paragraphs, and/or with disclosure from elsewhere in this application, including any attached Appendices and materials listed in the Cross-References, in any suitable manner. Some of the paragraphs below may expressly refer to and further limit other paragraphs, providing without limitation examples of some of the suitable combinations.

A0. A system for improving audio capture in a virtual production volume, the system comprising:

a virtual production volume including an electronic display wall formed in an oblong shape around a stage; and an acoustic baffle curtain disposed in front of a portion of the display wall and configured to absorb sound waves incident on the acoustic baffle;

wherein the baffle curtain is at least partially transparent, such that visible light from the display wall passes through the baffle curtain.

A1. The system of paragraph A0, wherein the baffle curtain is slidably coupled at a top edge to a curtain rail.

A2. The system of any one of paragraphs A0 or A1, wherein the curtain rail is attached to an upper structure of the virtual production volume.

A3. The system of any one of paragraphs A0 through A2, wherein the baffle curtain extends from the curtain rail to a surface of the stage.

A4. The system of any one of paragraphs A0 through A3, wherein the acoustic baffle curtain has a variable surface geometry.

A5. The system of any one of paragraphs A0 through A4, wherein the baffle curtain comprises a fire-resistant material.

A6. The system of paragraph A5, wherein the material of the baffle curtain is fire-resistant in accordance with CFM Reg. No. F-491.

A7. The system of paragraph A5 or A6, wherein the material of the baffle curtain is fire-resistant in accordance with NFPA-701.

A8. The system of any one of paragraphs A5-A7, wherein the material of the baffle curtain is fire-resistant in accordance with CPAI-84.

B0. A system for improving sound capture in a virtual production volume, comprising:

a virtual production volume including an LED wall formed in an oblong shape around a stage;

an acoustic baffle curtain disposed in front of a portion of the LED wall, the acoustic baffle curtain comprising a plurality of curtain sections each coupled to a frame; and wherein a first one of the curtain sections is oriented at an oblique angle to the stage surface and a second one of the curtain sections is vertical, such that collectively the acoustic baffle curtain has a variable surface geometry.

B1. The system of paragraph B0, wherein the frame comprises a curtain rail.

B2. The system of any one of paragraphs B0 or B1, wherein the curtain rail is attached to an upper structure of the virtual production volume.

B3. The system of any one of paragraphs B0 through B2, wherein the baffle curtain comprises a transparent material with respect to visible light.

B4. The system of any one of paragraphs B0 through B3, wherein the baffle curtain comprises a fire-resistant material.

B5. The system of paragraph B4, wherein the material of the baffle curtain is fire-resistant in accordance with CFM Reg. No. F-491.

B6. The system of paragraph B4 or B5, wherein the material of the baffle curtain is fire-resistant in accordance with NFPA-701.

B7. The system of any one of paragraphs B4-B6, wherein the material of the baffle curtain is fire-resistant in accordance with CPAI-84.

B5. The system of any one of paragraphs B0 through B4, wherein the first curtain section is held at the oblique angle by a ballasting device (e.g., a sandbag).

C0. A system for improving audio capture in a virtual production volume, the system comprising:

a virtual production volume including an electronic display wall at least partially enclosing a stage area; and an acoustic baffle curtain disposed on an interior of the production volume and configured to redirect sound waves incident on the acoustic baffle curtain;

wherein the acoustic baffle curtain is transparent, such that visible light produced by the display wall is transmitted to the stage area through the baffle curtain.

C1. The system of paragraph C0, wherein a top edge of the baffle curtain is slidably coupled to a curtain rail.

C2. The system of paragraph C0 or C1, wherein the baffle curtain comprises a clear vinyl sheet.

C3. The system of any one of paragraphs C0-C2, wherein the acoustic baffle curtain has a non-planar surface.

C4. The system of paragraph C3, wherein the non-planar surface of the baffle curtain has a ribbed texture.

C5. The system of paragraph C3 or C4, wherein the non-planar surface of the baffle curtain is configured to diffuse sound waves incident on the baffle curtain.

C6. The system of any one of paragraphs C0-C5, wherein the acoustic baffle curtain comprises a plurality of curtain sections.

C7. The system of paragraph C6, wherein a first one of the curtain sections is oriented non-vertically and a second one of the curtain sections is oriented vertically, such that a surface geometry of the acoustic baffle curtain varies from the first curtain section to the second curtain section.

C8. The system of paragraph C6 or C7, wherein the curtain sections are oriented to collectively form at least a portion of an inverted conical frustum.

C9. The system of any one of paragraphs C0-C8, wherein the baffle curtain comprises a fire-resistant material.

C10. The system of paragraph C9, wherein the material of the baffle curtain is fire-resistant in accordance with CFM Reg. No. F-491.

C11. The system of paragraph C9 or C10, wherein the material of the baffle curtain is fire-resistant in accordance with NFPA-701.

C12. The system of any one of paragraphs C9-C11, wherein the material of the baffle curtain is fire-resistant in accordance with CPAI-84.

D0. A system for improving sound capture in a virtual production volume, the system comprising:

a virtual production volume including an electronic display wall at least partially enclosing a stage; and an acoustic baffle curtain disposed on an interior of the production volume, the acoustic baffle curtain comprising a plurality of curtain sections each coupled to a frame;

wherein each of the curtain sections is transparent to visible light, such that light produced by the display wall passes through the curtain sections to the stage; and wherein at least one of the curtain sections is oriented non-vertically.

D1. The system of paragraph DO, wherein a first one of the curtain sections is oriented non-vertically and a second one of the curtain sections is oriented vertically, such that a surface geometry of the acoustic baffle curtain varies from the first curtain section to the second curtain section.

D2. The system of paragraph DO or D1, wherein each of the curtain sections is oriented non-vertically, such that the curtain sections collectively form at least a portion of an inverted conical frustum.

D3. The system of any one of paragraphs DO-D2, wherein the frame comprises a curtain rail.

D4. The system of any one of paragraphs DO-D3, wherein a bottom end of at least one curtain section is ballasted by a ballasting device.

D5. The system of paragraph D4, wherein the ballasting device comprises a sandbag coupled to the bottom end of the at least one curtain section.

D6. The system of any one of paragraphs DO-D5, wherein the curtain sections each comprise a clear vinyl sheet.

E0. A method of improving sound capture in a virtual production volume, the method comprising:

positioning an acoustic baffle curtain between a first portion of a display wall of a virtual production volume and a stage area of the virtual production volume; and reducing echoing in the stage area by redirecting sound waves using the acoustic baffle curtain;

wherein the acoustic baffle curtain is clear and transparent, such that visible light produced by the display wall is transmitted to the stage area through the baffle curtain.

E1. The method of paragraph E0, further comprising:

repositioning the acoustic baffle curtain such that the curtain is disposed between a second portion of the display wall and the stage area of the virtual production volume.

E2. The method of paragraph E1, wherein a top end of the acoustic baffle curtain is slidably coupled to a curtain rail, and wherein repositioning the acoustic baffle curtain includes sliding the baffle curtain on the curtain rail to a position, such that the acoustic baffle curtain is disposed between the second portion of the display wall and the stage area.

E3. The method of paragraph E1, wherein a top end of the acoustic baffle curtain is coupled to a movable stand, and wherein reposition the acoustic baffle curtain includes moving the movable stand to a position, such that the acoustic baffle curtain is disposed between the second portion of the display wall and the stage area.

Illustrative systems in accordance with aspects of the present disclosure may include one or more of the following:

A virtual production volume including an electronic display wall at least partially enclosing a stage area.

One or more acoustic baffle curtains disposed on an interior of a/the virtual production volume each configured to redirect, diffuse, and/or absorb sound waves incident on the acoustic baffle curtain.

The acoustic baffle curtain(s) may comprise one or more of the following:

- a fire-resistant material in accordance with one or more fire resistance tests, e.g., CFM Reg. No. F-491, NFPA-701, and/or CPAI-84.
- a transparent material with respect to visible light such that visible light produced by the display wall is transmitted to the stage area through the baffle curtain.
- a clear vinyl sheet.
- a non-planar surface (e.g., horizontally ribbed, vertically ribbed, dimpled, bubbled, etc.) configured to diffuse sound waves incident on the baffle curtain.
- a plurality of baffle curtain sections disposed adjacent to one another.
  - one or more of the baffle curtain sections oriented vertically and/or one or more of the baffle curtain sections oriented non-vertically.
  - each of the baffle curtain sections oriented non-vertically such that collectively the baffle curtain sections form at least a portion of an inverted conical frustum.
  - one or more of the baffle curtain sections disposed at a different yaw angle (e.g., about the Z-axis) as compared with one or more of the other baffle curtain sections.
  - a bottom end of one or more of the baffle curtain sections ballasted by a ballasting device (e.g., a sandbag).

A frame, wherein the acoustic baffle curtain is coupled to the frame, the frame may comprise one or more of the following elements:

- a curtain track (AKA curtain rail) coupled to an upper structure of the virtual production volume and/or a ceiling of a room in which the virtual production volume is disposed.
  - the curtain track disposed around a periphery of the display wall of the production volume, such that the baffle curtain is moveable on the curtain track to different positions within the production volume.
- a portable stand configured to be transportable to different positions within the virtual production volume.
  - the portable stand including a ballasting mechanism, wherein a top end of the baffle curtain is coupled to the movable stand and a bottom end of the baffle curtain is coupled to the ballasting mechanism.
  - the ballasting mechanism pivotably coupled to the portable stand and configured to transition the baffle curtain between a deployed position and a storage position.

Advantages, Features, and Benefits

The different embodiments and examples of the sound management system described herein provide several advantages over known solutions for managing sound reverberation within a virtual production volume.

For example, illustrative embodiments and examples described herein allow the sound management system to improve dialogue capture within a virtual production volume while also facilitating the ambient lighting effects of a virtual production volume, e.g., by including a transparent or translucent baffle curtain configured to absorb and/or redirect sound waves within the virtual production volume.

Additionally, and among other benefits, illustrative embodiments and examples described herein allow the baffles to be relocated or repositioned within the production volume. The baffle curtain may hang from a curtain rod extending around a portion of the virtual production volume and/or a portable stand, such that the baffle curtain can be moved to different locations within the virtual production volume.

Additionally, and among other benefits, illustrative embodiments and examples described herein allow a transparent baffle curtain configured to facilitate reduction of sound reverberation within a virtual production volume, while allowing transmission with respect to visible light. This arrangement facilitates visible light produced by LED walls of the virtual production volume passing through the baffle curtain to be utilized as ambient lighting in a stage area of the volume.

Additionally, and among other benefits, illustrative embodiments and examples described herein allow a baffle curtain including a plurality of curtain sections held at different angles relative to the ground, such that the overall effective baffle surface has a variable surface geometry. The variable surface geometry of the baffle curtain improves sound absorption by the baffle curtain.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A system for improving audio capture in a virtual production volume, the system comprising:

a virtual production volume including an electronic display wall at least partially enclosing a stage area; and an acoustic baffle curtain disposed on an interior of the production volume and configured to redirect sound waves incident on the acoustic baffle curtain, wherein the acoustic baffle curtain is transparent, and wherein the baffle curtain is arranged across a front of the display wall such that visible light produced by the display wall is transmitted to the stage area through the baffle curtain.

2. The system of claim 1, wherein a top edge of the baffle curtain is slidably coupled to a curtain rail, wherein the curtain rail is arranged at a top area of the production volume and the baffle curtain extends down from the curtain rail, and wherein the baffle curtain extends across the display wall at a distance from the display wall.

3. The system of claim 1, wherein the baffle curtain comprises a clear vinyl sheet, and wherein the baffle curtain has a transmittance of 90% or more with respect to visible light.

4. The system of claim 1, wherein the acoustic baffle curtain has a non-planar surface.

5. The system of claim 4, wherein the non-planar surface of the baffle curtain has a ribbed texture.

6. The system of claim 1, wherein the acoustic baffle curtain comprises a plurality of curtain sections.

7. The system of claim 6, wherein a first one of the curtain sections is oriented non-vertically and a second one of the curtain sections is oriented vertically, such that a surface geometry of the acoustic baffle curtain varies from the first curtain section to the second curtain section.

8. The system of claim 6, wherein the curtain sections are oriented to collectively form at least a portion of an inverted conical frustum.

9. The system of claim 1, wherein the baffle curtain comprises a fire-resistant material.

10. A system for improving sound capture in a virtual production volume, the system comprising:

a virtual production volume including an electronic display wall at least partially enclosing a stage; and an acoustic baffle curtain disposed on an interior of the production volume, the acoustic baffle curtain comprising a plurality of curtain sections each coupled to a frame, wherein each of the curtain sections is transparent to visible light, and wherein each baffle curtain is arranged across a front of the display wall such that light produced by the display wall passes through the curtain sections to the stage; and wherein at least one of the curtain sections is oriented non-vertically.

11. The system of claim 10, wherein a first one of the curtain sections is oriented non-vertically and a second one of the curtain sections is oriented vertically, such that a surface geometry of the acoustic baffle curtain varies from the first curtain section to the second curtain section.

12. The system of claim 10, wherein each of the curtain sections is oriented non-vertically, such that the curtain sections collectively form at least a portion of an inverted conical frustum.

13. The system of claim 10, wherein the frame comprises a curtain rail, wherein a top edge of the baffle curtain is slidably coupled to the curtain rail, wherein the curtain rail is arranged at a top area of the production volume and the baffle curtain extends down from the curtain rail, and wherein the baffle curtain extends across the display wall at a distance from the display wall.

14. The system of claim 13, wherein a bottom end of at least one curtain section is ballasted by a ballasting device.

15. The system of claim 14, wherein the ballasting device comprises a sandbag coupled to the bottom end of the at least one curtain section.

16. The system of claim 10, wherein the curtain sections each comprise a clear vinyl sheet.

17. A method of improving sound capture in a virtual production volume, the method comprising:

positioning an acoustic baffle curtain between a first portion of a display wall of a virtual production volume and a stage area of the virtual production volume; and reducing echoing in the stage area by redirecting sound waves using the acoustic baffle curtain;

wherein the acoustic baffle curtain is clear and transparent, such that visible light produced by the display wall is transmitted to the stage area through the baffle curtain.

18. The method of claim 17, further comprising:

repositioning the acoustic baffle curtain such that the baffle curtain is disposed between a second portion of the display wall and the stage area of the virtual production volume.

19. The method of claim 18, wherein a top end of the acoustic baffle curtain is slidably coupled to a curtain rail, and wherein repositioning the acoustic baffle curtain includes sliding the baffle curtain on the curtain rail to a position, such that the acoustic baffle curtain is disposed between the second portion of the display wall and the stage area.

20. The method of claim 18, wherein a top end of the acoustic baffle curtain is coupled to a movable stand, and wherein reposition the acoustic baffle curtain includes moving the movable stand to a position, such that the acoustic baffle curtain is disposed between the second portion of the display wall and the stage area.

* * * * *